United States Patent
Yoshida

(10) Patent No.: US 8,807,676 B2
(45) Date of Patent: Aug. 19, 2014

(54) CONTROL DEVICE

(75) Inventor: Yasunari Yoshida, Aichi-ken (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 146 days.

(21) Appl. No.: 13/429,659

(22) Filed: Mar. 26, 2012

(65) Prior Publication Data

US 2013/0070009 A1    Mar. 21, 2013

(30) Foreign Application Priority Data

Sep. 16, 2011    (JP) .................................. 2011-202653

(51) Int. Cl.
   *B41J 29/38*    (2006.01)
   *B41J 2/045*    (2006.01)

(52) U.S. Cl.
   CPC .................................. *B41J 2/04541* (2013.01)
   USPC ............................................................ 347/9

(58) Field of Classification Search
   CPC .. B41J 2/04541; B41J 2/0458; B41J 2/04581; B41J 2/04588; B41J 2/04543
   USPC ............. 347/5, 9, 14, 15, 19, 40–43; 358/1.2, 358/1.9
   IPC ....................................................... B41J 29/38
   See application file for complete search history.

(56) References Cited

U.S. PATENT DOCUMENTS

| | | | |
|---|---|---|---|
| 5,946,011 A | 8/1999 | Kanaya | |
| 5,953,459 A | 9/1999 | Ueda et al. | |
| 6,203,134 B1 | 3/2001 | Kakutani et al. | |
| 7,290,845 B2 | 11/2007 | Tanaka et al. | |
| 2002/0027572 A1* | 3/2002 | Kato et al. | 347/15 |
| 2002/0075494 A1* | 6/2002 | Kakutani | 358/1.9 |
| 2005/0179711 A1 | 8/2005 | Yoshida | |

(Continued)

FOREIGN PATENT DOCUMENTS

| | | |
|---|---|---|
| JP | 5-30361 A | 2/1993 |
| JP | 11-58704 | 3/1999 |

(Continued)

OTHER PUBLICATIONS

U.S. Office Action dated Feb. 1, 2013, received in related U.S. Appl. No. 12/973,286.

(Continued)

*Primary Examiner* — Manish S Shah
*Assistant Examiner* — Roger W Pisha, II
(74) *Attorney, Agent, or Firm* — Scully, Scott, Murphy & Presser, P.C.

(57) ABSTRACT

A control device may generate processed image data, supply the processed image data to a print performing unit and execute a compensation process on a target pixel by using correcting data for a target image forming element which is to form an image at a position corresponding to a target pixel. The correcting data may be data acquired by using a difference between a target value and a value being acquired by using characteristic data corresponding to a first image forming element within a plurality of image forming elements. The target value may be acquired by using characteristic data corresponding to the target image forming element. The first image forming element may be an image forming element which is to form a first neighbor raster neighboring a target raster formed on the print medium by the target image forming element.

13 Claims, 21 Drawing Sheets

(56) References Cited

U.S. PATENT DOCUMENTS

| | | | |
|---|---|---|---|
| 2006/0066927 A1* | 3/2006 | Tanaka | 358/518 |
| 2006/0170973 A1 | 8/2006 | Takahashi | |
| 2007/0008355 A1 | 1/2007 | Miyamoto et al. | |
| 2008/0079960 A1 | 4/2008 | Yamazaki | |
| 2009/0051944 A1* | 2/2009 | Bracke et al. | 358/1.9 |
| 2010/0060691 A1* | 3/2010 | Tanase et al. | 347/14 |
| 2010/0309243 A1* | 12/2010 | Nakano et al. | 347/15 |
| 2011/0033124 A1* | 2/2011 | Kuno | 382/233 |
| 2011/0148966 A1 | 6/2011 | Yoshida et al. | |

FOREIGN PATENT DOCUMENTS

| | | |
|---|---|---|
| JP | 2000-25212 | 1/2000 |
| JP | 2000-99716 | 4/2000 |
| JP | 2001-38892 | 2/2001 |
| JP | 2005-138500 A | 6/2005 |
| JP | 2005-225199 | 8/2005 |
| JP | 2006-315411 A | 11/2006 |
| JP | 2007-15336 A | 1/2007 |
| JP | 2007-19652 A | 1/2007 |
| JP | 2007-237398 A | 9/2007 |
| JP | 2011-131428 | 7/2011 |
| JP | 2011-131473 | 7/2011 |

OTHER PUBLICATIONS

Notification of Reasons for Rejection dated Sep. 3, 2013 received from the Japanese Patent Office from related Application No. 2009-291083, together with an English language translation.

U.S. Office Action dated Oct. 10, 2013, received in related U.S. Appl. No. 12/973,286.

U.S. Office Action dated Mar. 28, 2014 received in related U.S. Appl. No. 12/973,286.

* cited by examiner

FIG. 3

Characteristic Data Table 60

| Nozzle No. | Characteristic Data |
|---|---|
| Nk1 | 6 |
| Nk2 | 3 |
| Nk3 | 1.5 |
| Nk4 | 2.0 |
| ⋮ | ⋮ |
| Nkn−1 | 5 |
| Nkn | 7 |

| Nozzle No. | Characteristic Data |
|---|---|
| Nc1 | 5 |
| Nc2 | 3 |
| Nc3 | 2 |
| Nc4 | 0 |
| ⋮ | ⋮ |
| Ncn−1 | 0 |
| Ncn | 2 |

| Nozzle No. | Characteristic Data |
|---|---|
| Nm1 | 8 |
| Nm2 | 0 |
| Nm3 | 3 |
| Nm4 | 2 |
| ⋮ | ⋮ |
| Nmn−1 | 3 |
| Nmn | 8 |

| Nozzle No. | Characteristic Data |
|---|---|
| Ny1 | 3 |
| Ny2 | 3 |
| Ny3 | 0.5 |
| Ny4 | 0 |
| ⋮ | ⋮ |
| Nyn−1 | 1.5 |
| Nyn | 1 |

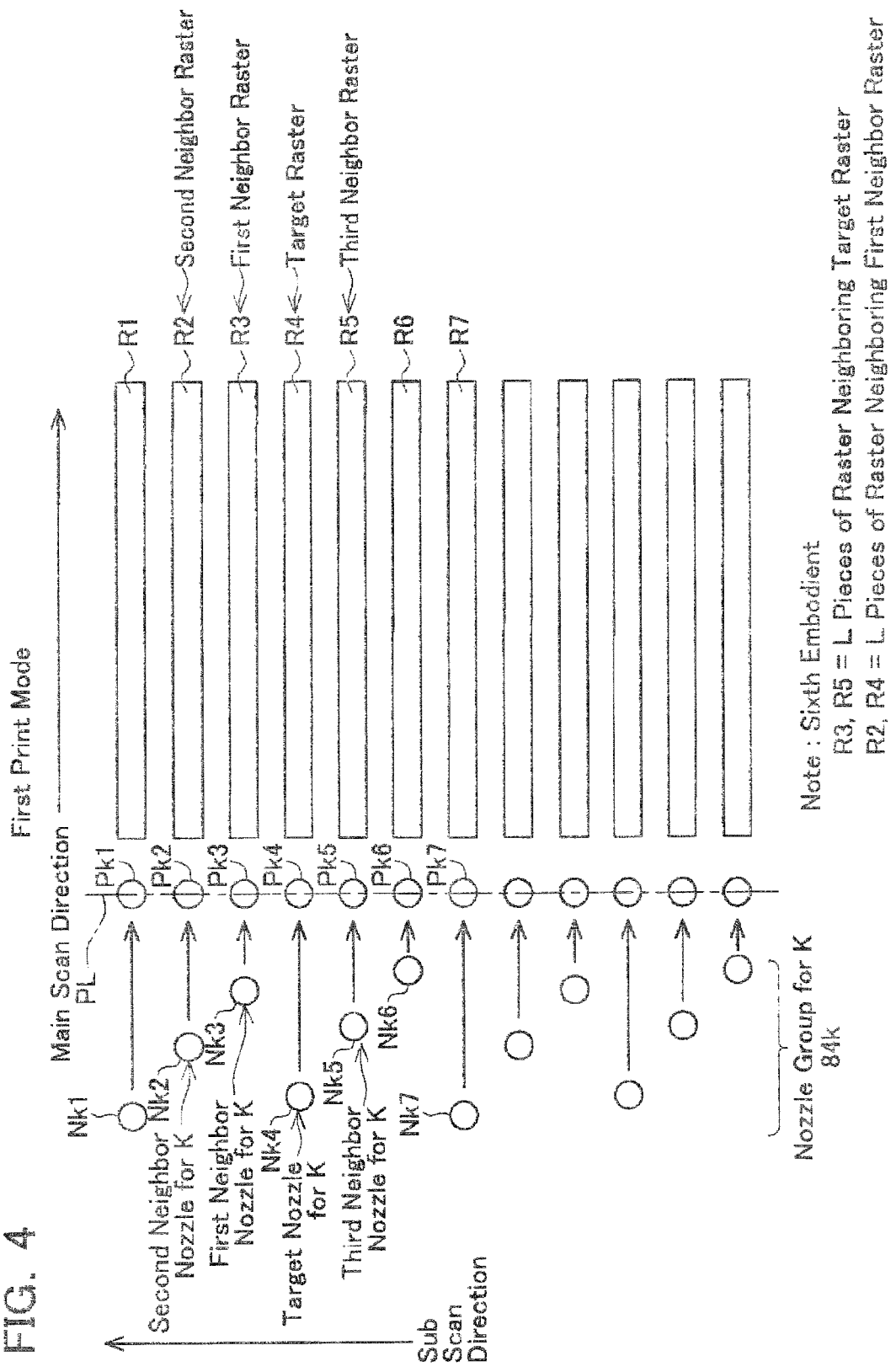

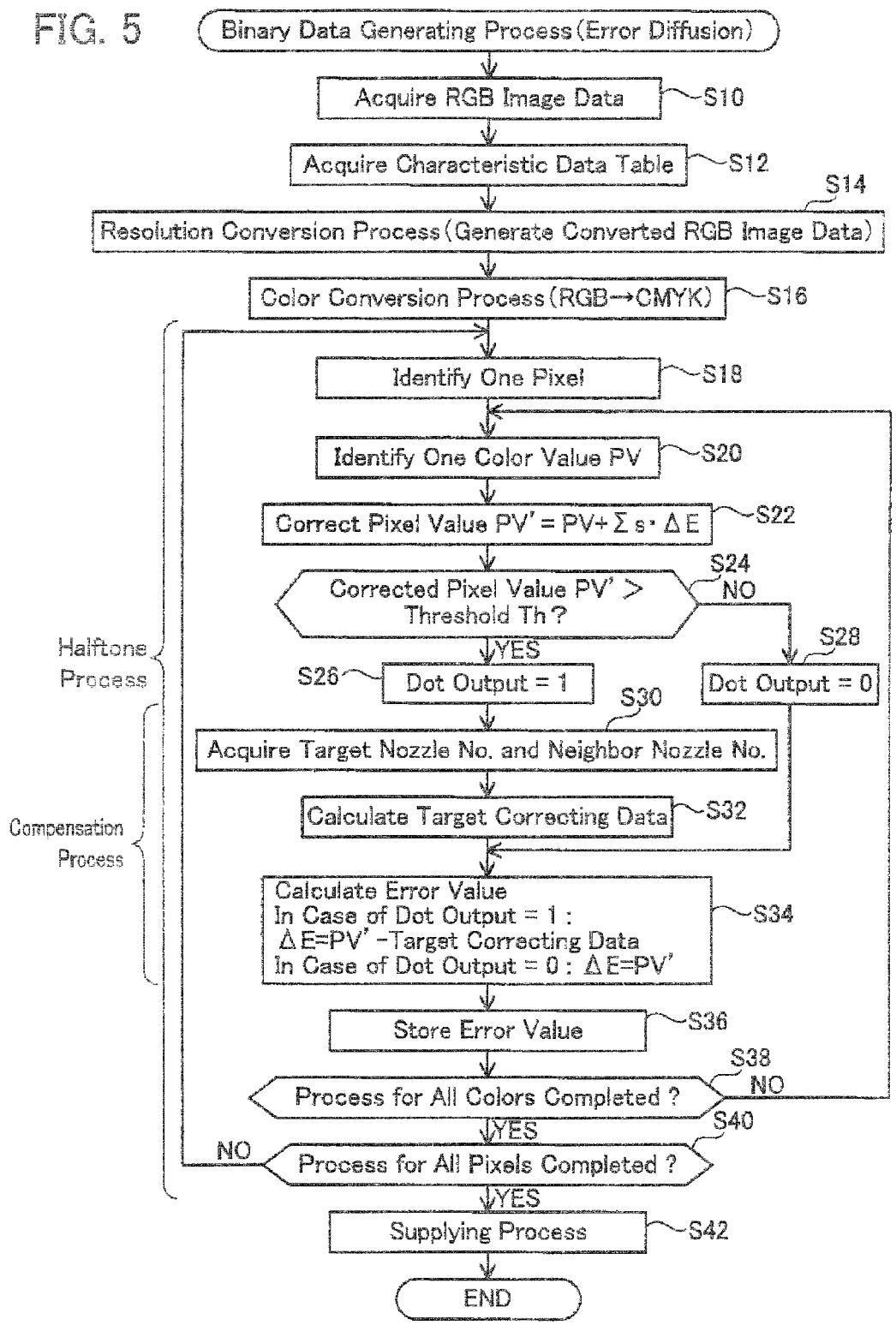

FIG. 6   Converted RGB Image Data 200

| (i-2,j-2) R(i-2,j-2) G(i-2,j-2) B(i-2,j-2) | (i-1,j-2) R(i-1,j-2) G(i-1,j-2) B(i-1,j-2) | (i,j-2) R(i,j-2) G(i,j-2) B(i,j-2) | (i+1,j-2) R(i+1,j-2) G(i+1,j-2) B(i+1,j-2) |
|---|---|---|---|
| (i-2,j-1) R(i-2,j-1) G(i-2,j-1) B(i-2,j-1) | (i-1,j-1) R(i-1,j-1) G(i-1,j-1) B(i-1,j-1) | (i,j-1) R(i,j-1) G(i,j-1) B(i,j-1) | (i+1,j-1) R(i+1,j-1) G(i+1,j-1) B(i+1,j-1) |
| (i-2,j) R(i-2,j) G(i-2,j) B(i-2,j) | (i-1,j) R(i-1,j) G(i-1,j) B(i-1,j) | (i,j) R(i,j) G(i,j) B(i,j) ↑ 207 | (i+1,j) R(i+1,j) G(i+1,j) B(i+1,j) ↑ 208 |

FIG. 7   CMYK Image Data 210

| (i-2,j-2) C(i-2,j-2) M(i-2,j-2) Y(i-2,j-2) K(i-2,j-2) | (i-1,j-2) C(i-1,j-2) M(i-1,j-2) Y(i-1,j-2) K(i-1,j-2) | (i,j-2) C(i,j-2) M(i,j-2) Y(i,j-2) K(i,j-2) | (i+1,j-2) C(i+1,j-2) M(i+1,j-2) Y(i+1,j-2) K(i+1,j-2) |
|---|---|---|---|
| (i-2,j-1) C(i-2,j-1) M(i-2,j-1) Y(i-2,j-1) K(i-2,j-1) | (i-1,j-1) C(i-1,j-1) M(i-1,j-1) Y(i-1,j-1) K(i-1,j-1) | (i,j-1) C(i,j-1) M(i,j-1) Y(i,j-1) K(i,j-1) | (i+1,j-1) C(i+1,j-1) M(i+1,j-1) Y(i+1,j-1) K(i+1,j-1) |
| (i-2,j) C(i-2,j) M(i-2,j) Y(i-2,j) K(i-2,j) | (i-1,j) C(i-1,j) M(i-1,j) Y(i-1,j) K(i-1,j) | (i,j) C(i,j) M(i,j) Y(i,j) K(i,j) ↑ 217 | (i+1,j) C(i+1,j) M(i+1,j) Y(i+1,j) K(i+1,j) ↑ 218 |

FIG. 8

| (i−2,j−2) ΔEk(i−2,j−2) | (i−1,j−2) ΔE(i−1,j−2) | (i,j−2) ΔE(i,j−2) ↑ 211 | (i+1,j−2) ΔE(i+1,j−2) |
|---|---|---|---|
| (i−2,j−1) ΔEk(i−2,j−1) | (i−1,j−1) ΔE(i−1,j−1) ↑ 212 | (i,j−1) ΔE(i,j−1) ↑ 213 | (i+1,j−1) ΔE(i+1,j−1) ↑ 214 |
| (i−2,j) ΔEk(i−2,j) ↑ 215 | (i−1,j) ΔE(i−1,j) ↑ 216 | (i,j) ΔE(i,j) PV'(i,j)=PV(i,j) +Σs·ΔE ↑ 217 | (i+1,j) ΔE(i+1,j) ↑ 218 |

First Embodiment : Case of Error Diffusion Matrix 250
  $\Sigma s \cdot \Delta E = 1/2 \cdot \Delta E(i-1,j) + 1/2 \cdot \Delta E(i,j-1)$ Second Embodiment or Third Embodiment :
Case of Error Diffusion Matrix 252
  $\Sigma s \cdot \Delta E = 2/8 \cdot \Delta E(i-1,j) + 1/8 \cdot \Delta E(i-2,j) + 1/8 \cdot \Delta E(i+1,j-1)$
    $+ 2/8 \cdot \Delta E(i,j-1) + 1/8 \cdot \Delta E(i-1,j-1) + 1/8 \cdot \Delta E(i,j-2)$ Error Diffusion Matrix 250

|   |   |   |
|---|---|---|
|   |   |   |
|   | 1 |   |
| 1 | Target Pixel |   |

Error Diffusion Matrix 252

|   |   | 1 |   |
|---|---|---|---|
|   | 1 | 2 | 1 |
| 1 | 2 | Target Pixel |   |

FIG. 9

(First Embodiment)   Dtarget = Characteristic Data of Target Nozzle
                     Dpre1 = Characteristic Data of First Neighbor Nozzle

| 217 | 218 |
|---|---|
| (i,j) | (i+1,j) |
| PV'(i,j)>Th    Dot Output = 1 | PV'(i+1,j)≤Th  Dot Output = 0 |
| ΔE(i,j)=PV'(i,j)− (255+Dtarget+x·(Dtarget−Dpre1))    Target Correcting Data | ΔE(i+1,j)=PV'(i+1,j) |
| x=1/2 × r  Design Value | |

FIG. 10

(Second Embodiment)

| 217 | 218 |
|---|---|
| (i,j) | (i+1,j) |
| PV'(i,j)>Th    Dot Output = 1 | PV'(i+1,j)≤Th  Dot Output = 0 |
| ΔE(i,j)=PV'(i,j)− (255+Dtarget+x·(Dtarget−Dpre1))    Target Correcting Data | ΔE(i+1,j)=PV'(i+1,j) |
| x=5/8 × r  Design Value | |

(Third Embodiment) Dtarget = Characteristic Data of Target Nozzle
Dpre1 = Characteristic Data of First Neighbor Nozzle
Dpre2 = Characteristic Data of Second Neighbor Nozzle

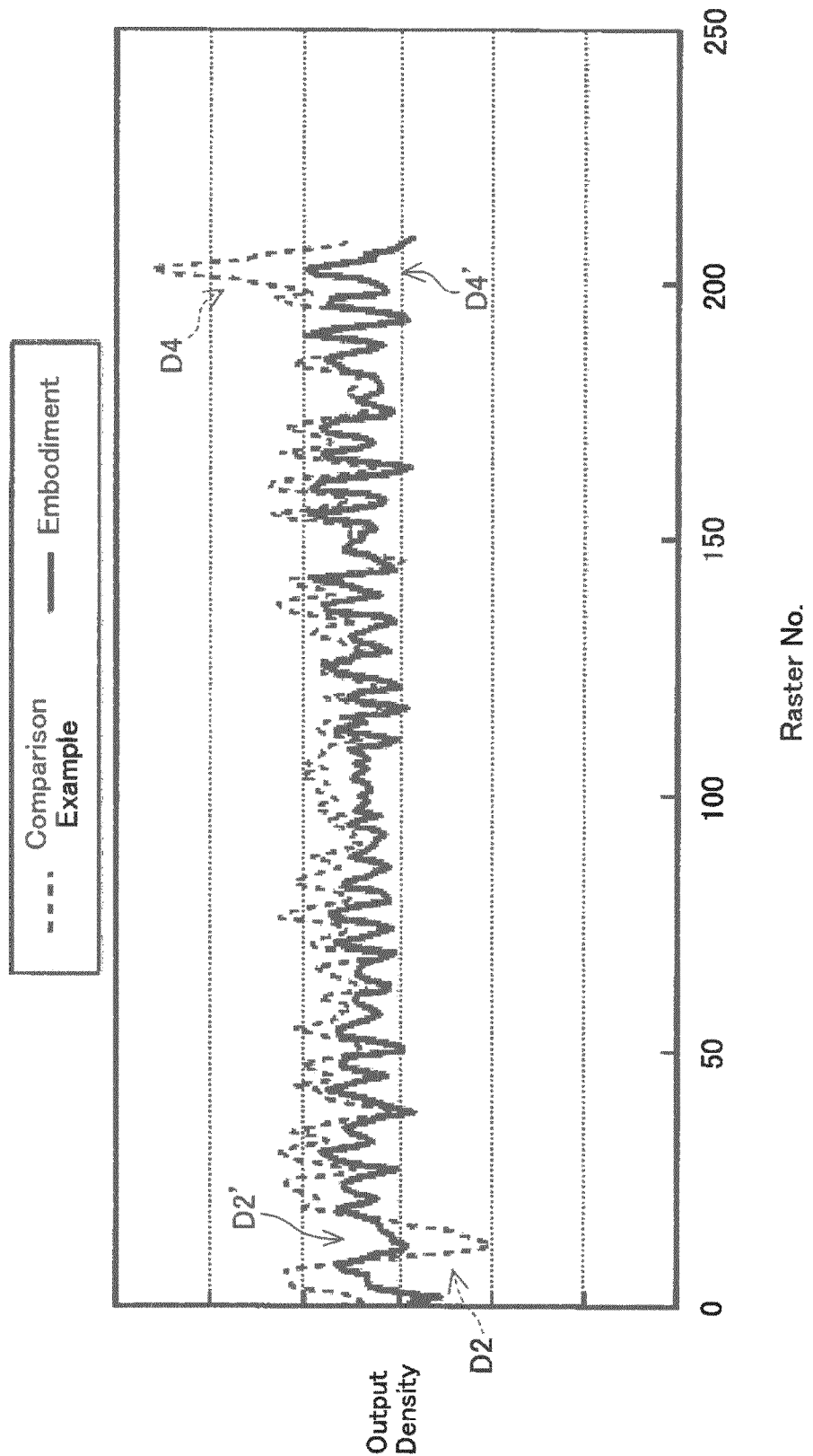

FIG. 15
(Fifth Embodiment)

Compensated Image Data 300

| (i−2, j−1) | (i−1, j−1) | (i, j−1) | (i+1, j−1) |
|---|---|---|---|
| PV"(i−2, j−1) =CD(j−1) ×PV(i−2, j−1) | PV"(i−1, j−1) =CD(j−1) ×PV(i−1, j−1) | PV"(i, j−1) =CD(j−1) ×PV(i, j−1) | PV"(i+1, j−1) =CD(j−1) ×PV(i+1, j−1) |
| (i−2, j) | (i−1, j) | (i, j) | (i+1, j) |
| PV"(i−2, j) =CD(j) ×PV(i−2, j) | PV"(i−1, j) =CD(j) ×PV(i−1, j) | PV"(i, j) =CD(j) ×PV(i, j) | PV"(i+1, j) =CD(j) ×PV(i+1, j) |

307

$$CD(j) = \frac{255 + \text{Minimum Characteristic Data}}{\text{Target Correcting Data}}$$

(ex. $255 + D_{target} + x \cdot (D_{target} - D_{pre1})$)

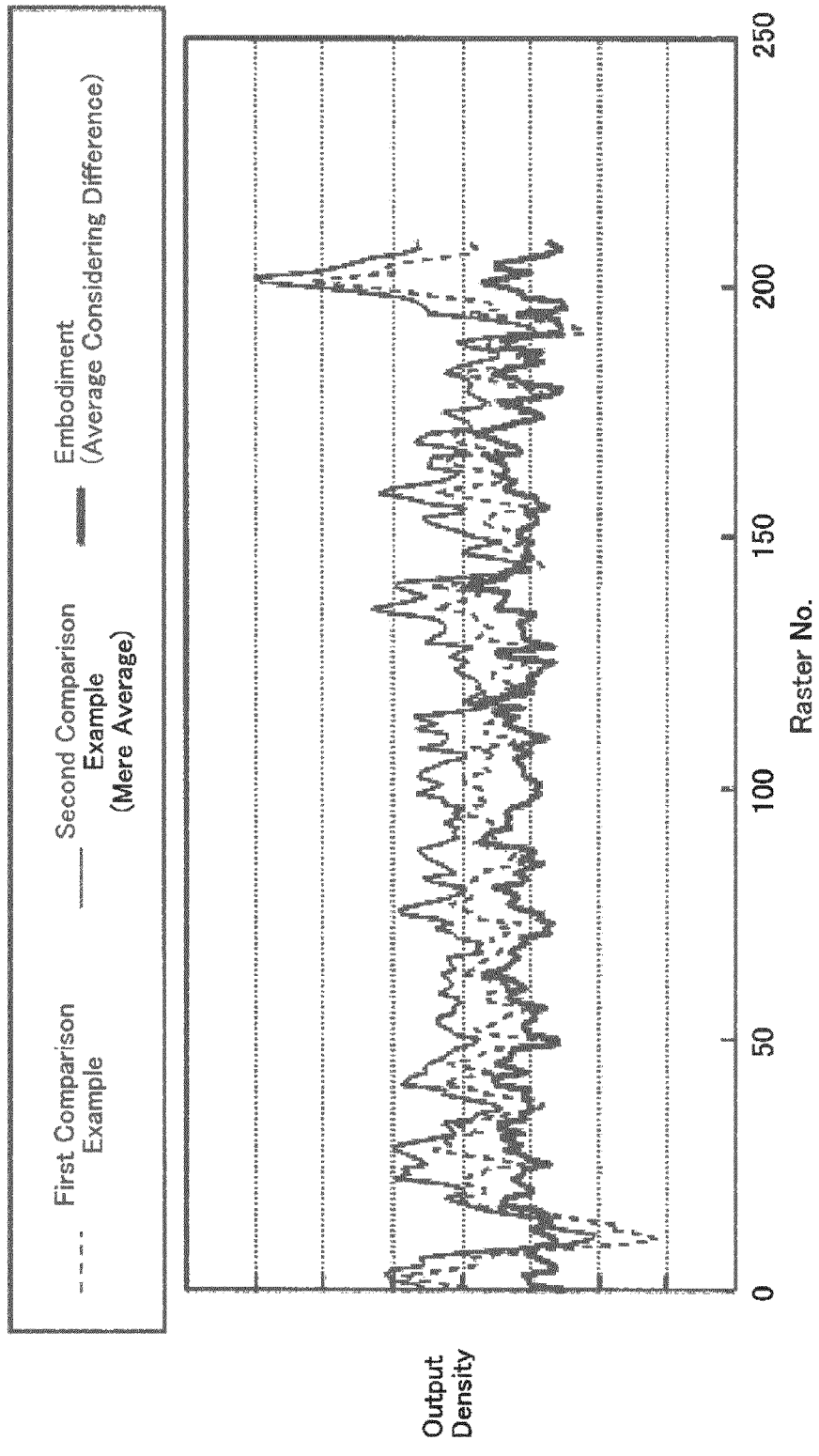
FIG. 16A (Sixth Embodiment)

FIG. 16C

First Comparison Example :
   Target Correcting Data = 255+Dtarget
Second Comparison Example :
   Target Correcting Data = 255+AVEtarget
Sixth Embodiment :
   Target Correcting Data = 255+AVEtarget+(AVEtarget−AVEpre1)
                                    (ex. Average of Nk3 to Nk5) (ex. Average of Nk2 to Nk4)

(Seventh Embodiment)

(Seventh Embodiment) Second Print Mode (Eighth Embodiment)   Third Print Mode

FIG. 21

(Tenth Embodiment)

Correcting Data Table 400

| Nozzle No. | Correcting Data |
|---|---|
| Nk1 | 259 |
| Nk2 | 258 |
| Nk3 | 256.5 |
| Nk4 | 257 |
| ⋮ | ⋮ |
| Nkn−1 | 255 |
| Nkn | 256.5 |

| Nozzle No. | Correcting Data |
|---|---|
| Nc1 | 257 |
| Nc2 | 258 |
| Nc3 | 257 |
| Nc4 | 255 |
| ⋮ | ⋮ |
| Ncn−1 | 256.5 |
| Ncn | 256.5 |

| Nozzle No. | Correcting Data |
|---|---|
| Nm1 | 259 |
| Nm2 | 255 |
| Nm3 | 258 |
| Nm4 | 257 |
| ⋮ | ⋮ |
| Nmn−1 | 257 |
| Nmn | 257 |

| Nozzle No. | Correcting Data |
|---|---|
| Ny1 | 256.5 |
| Ny2 | 258 |
| Ny3 | 256.5 |
| Ny4 | 255 |
| ⋮ | ⋮ |
| Nyn−1 | 256 |
| Nyn | 256 |

CONTROL DEVICE

CROSS-REFERENCE TO RELATED APPLICATIONS

This application claims priority to Japanese Patent Application No. 2011-202653, filed on Sep. 16, 2011, the contents of which are hereby incorporated by reference into the present application.

TECHNICAL FIELD

The present application discloses a control device for causing a print performing unit to perform a print.

DESCRIPTION OF RELATED ART

A technique for generating binary data is known in which an image process in accordance with an error diffusion method is executed on RGB image data. In this technique, in the course of the image process in accordance with the error diffusion method, a process is executed for compensating for variability in a discharging volume of ink droplets discharged from a plurality of nozzles.

SUMMARY

In the present specification, a technique is disclosed that is capable of adequately compensating for the variability of outputs of a plurality of image forming elements in a case where the image process in accordance with the error diffusion method is to be executed.

A technique disclosed in the application is a control device for causing a print performing unit to perform a print. The print performing unit may include a print head on which a plurality of image forming elements is formed. The control device may comprise one or more processors and a memory that stores a computer program including instructions executed by the one or more processors. The instructions may cause the one or more processors, when executed by the one or more processors, to function as a first generating unit and a supplying unit. The first generating unit may be configured to generate a first type of processed image data by executing a first type of image process on target image data of a process target in accordance with an error diffusion method. The supplying unit may be configured to supply the first type of processed image data to the print performing unit in a case where the first type of processed image data is generated. The first generating unit may include a compensating unit configured to execute a compensation process on a target pixel within the target image data for compensating variability of outputs of the plurality of the image forming elements, by using correcting data for a target image forming element. The target image forming element may be to form an image at a position corresponding to the target pixel on the print medium. The correcting data may be data acquired by using a first difference which is a difference between a target value and a first value. The target value may be acquired by using characteristic data corresponding to the target image forming element. The first value may be acquired by using characteristic data corresponding to a first image forming element within the plurality of image forming elements. The first image forming element may be an image forming element which is to form a first neighbor raster neighboring a target raster formed on the print medium by the target image forming element. The first image forming element may be an image forming element which is to form an image at a position corresponding to a first pixel on print medium. The first pixel may be a pixel for which an error value is calculated before the target pixel. The characteristic data may be data related to an output of an image forming element corresponding to the characteristic data.

Moreover, a control method and a computer program for realizing the communication device described above, and a non-transitory computer-readable storage medium in which the computer program is stored are also novel and useful.

BRIEF DESCRIPTION OF THE DRAWINGS

FIG. 3 shows a characteristic data table.
FIG. 4 shows a raster group formed in a first print mode.
FIG. 5 shows a flowchart of a binary data generating process in accordance with an error diffusion method.
FIG. 6 shows pixels within converted RGB image data.
FIG. 7 shows pixels within CMYK image data.
FIG. 8 shows an error value of pixels within the CMYK image data and an example of an error diffusion matrix.
FIG. 9 shows a formula of a first embodiment for calculating the error value.
FIG. 10 shows a formula of a second embodiment for calculating the error value.
FIG. 12A shows graph for explaining the results of the first embodiment.
FIG. 15 shows pixels within compensated image data.
FIG. 16A shows graph for explaining the results of a sixth embodiment.
FIG. 16C shows formulas for target correcting data of the sixth embodiment.
FIG. 21 shows a correcting data table of a tenth embodiment.

EMBODIMENT

First Embodiment (Configuration of System)

Figure 1:
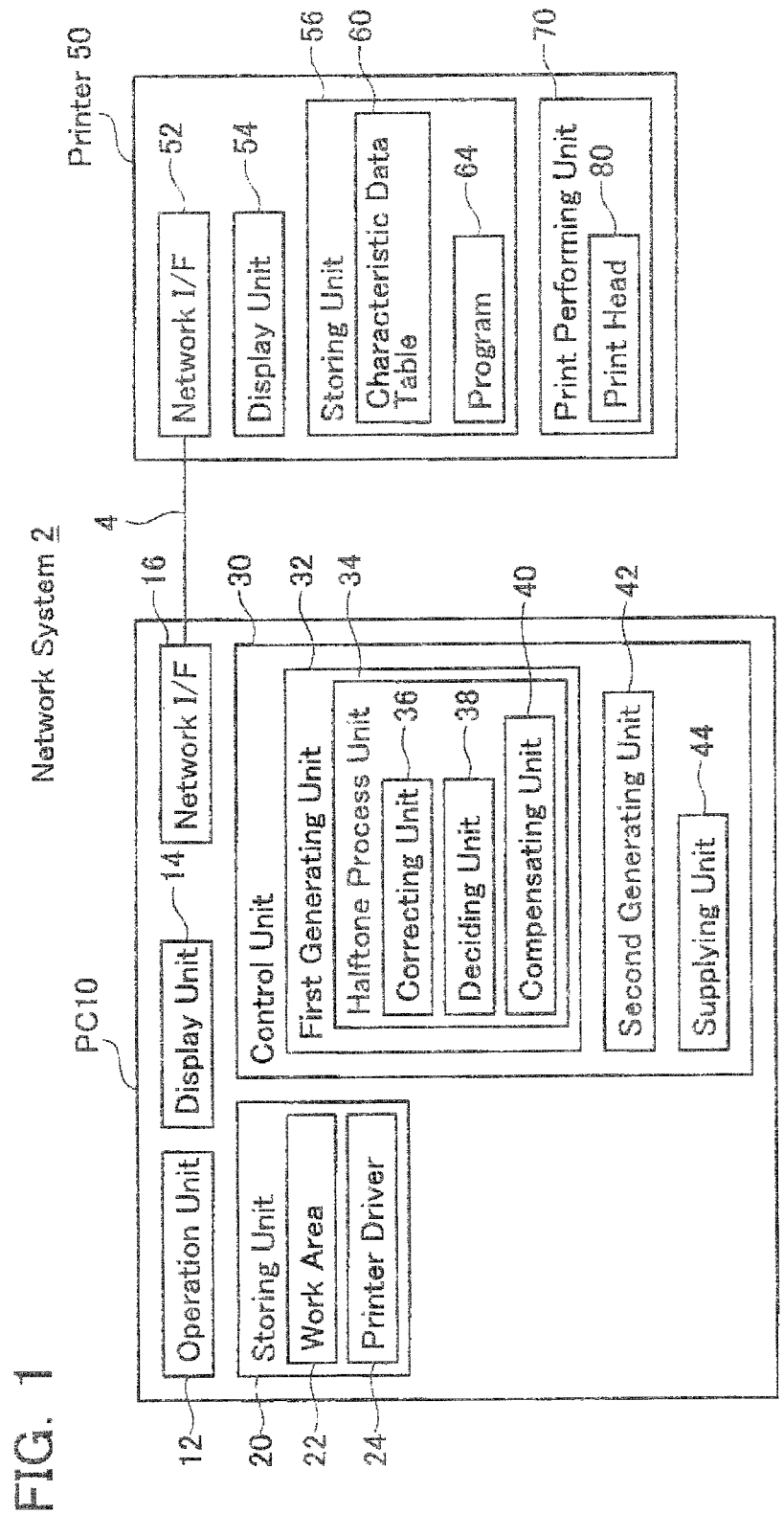
FIG. 1 shows a configuration of a network system.

FIG. 1 shows a schematic view of a network system 2. The network system 2 comprises a PC 10 and a printer 50. The PC 10 and the printer 50 are connected with a LAN 4. The PC 10 and the printer 50 can communicate with one another via the LAN 4.

(Configuration of PC 10)

The PC 10 comprises an operation unit 12, a display unit 14, a network interface 16, a storing unit 20 and a control unit 30. The operation unit 12 comprises a mouse and a keyboard. A user can input various instructions to the PC 10 by operating the operation unit 12. The display unit 14 is a display for displaying various information. The network interface 16 is connected with the LAN 4.

The storing unit 20 comprises a work area 22. The work area 22 stores, e.g., print target data. The print target data may be, e.g., data generated by an application within the PC 10, data acquired from an external device, etc. Word processing software, spreadsheet software, etc. can be given as examples of the application within the PC 10. A server on the Internet, a device connected to the LAN 4, a portable storage medium, etc., can be given as examples of the external device.

The storing unit 20 further stores a printer driver 24 for the printer 50. The printer driver 24 is software for sending various instructions (e.g., a print instruction) to the printer 50. The printer driver 24 may be installed on the PC 10 from, e.g., a non-transitory computer-readable storage medium stored by the printer driver 24, or may be installed on the PC 10 from a server on the internet.

The control unit 30 executes various processes in accordance with a program (e.g., the printer driver 24) stored in the storing unit 20. The control unit 30 realizes the functions of a first generating unit 32, a second generating unit 42 and a supplying unit 44 by executing processes in accordance with the printer driver 24. The first generating unit 32 includes a halftone process unit 34. The halftone process unit 34 includes a correcting unit 36, a deciding unit 38 and a compensating unit 40.

(Configuration of Printer 50)

The printer 50 comprises a network interface 52, a display unit 54, a storing unit 56 and a print performing unit 70. The network interface 52 is connected with the LAN 4. The display unit 54 is a display for displaying various information. The print performing unit 70 prints an image represented by binary data supplied from the PC 10 onto a print medium in accordance with a program 64 stored in the storing unit 56. The print performing unit 70 comprises a print head 80. In addition to the print head 80, the print performing unit 70 comprises a driving mechanism of the print head 80 and a transporting mechanism of the print medium, etc. (not shown).

The driving mechanism of the print head 80 comprises a carriage and a motor that moves the carriage. The print head 80 is mounted removably on the carriage. The carriage moves back and forth in a predetermined direction within a body of the printer 50. When the carriage moves, the print head 80 also moves. The direction of back and forth movement of the carriage, i.e., the direction of back and forth movement of the print head 80, is called a "main scan direction". Further, in the present embodiment, the print head 80 performing one back and forth movement is called "one main scan".

The driving mechanism of the print head 80 further comprises a circuit that supplies a driving signal to the print head 80. When the driving signal is supplied to the print head 80, ink droplets are discharged from a nozzle group 84k, etc. (see FIG. 2) formed on the print head 80. In the present embodiment, the driving signal is supplied to the print head 80 such that the ink droplets are discharged from the nozzle group 84k, etc. during the outgoing path of one main scan. Moreover, ink droplets are not discharged from the nozzle group 84k, etc. during the returning path of one main scan.

The transporting mechanism of the print medium transports the print medium in a direction perpendicular to the main scan direction. The transporting direction of the print medium is called a "sub scan direction". Moreover, in another embodiment, the driving signal may be supplied to the print head 80 such that the ink droplets are discharged from the nozzle group 84k, etc. during both the outgoing path and the returning path of one back and forth movement of the print head 80. In this case, each of the outgoing path and the returning path in one back and forth movement of the print head 80 can be called "one main scan".

Figure 2:
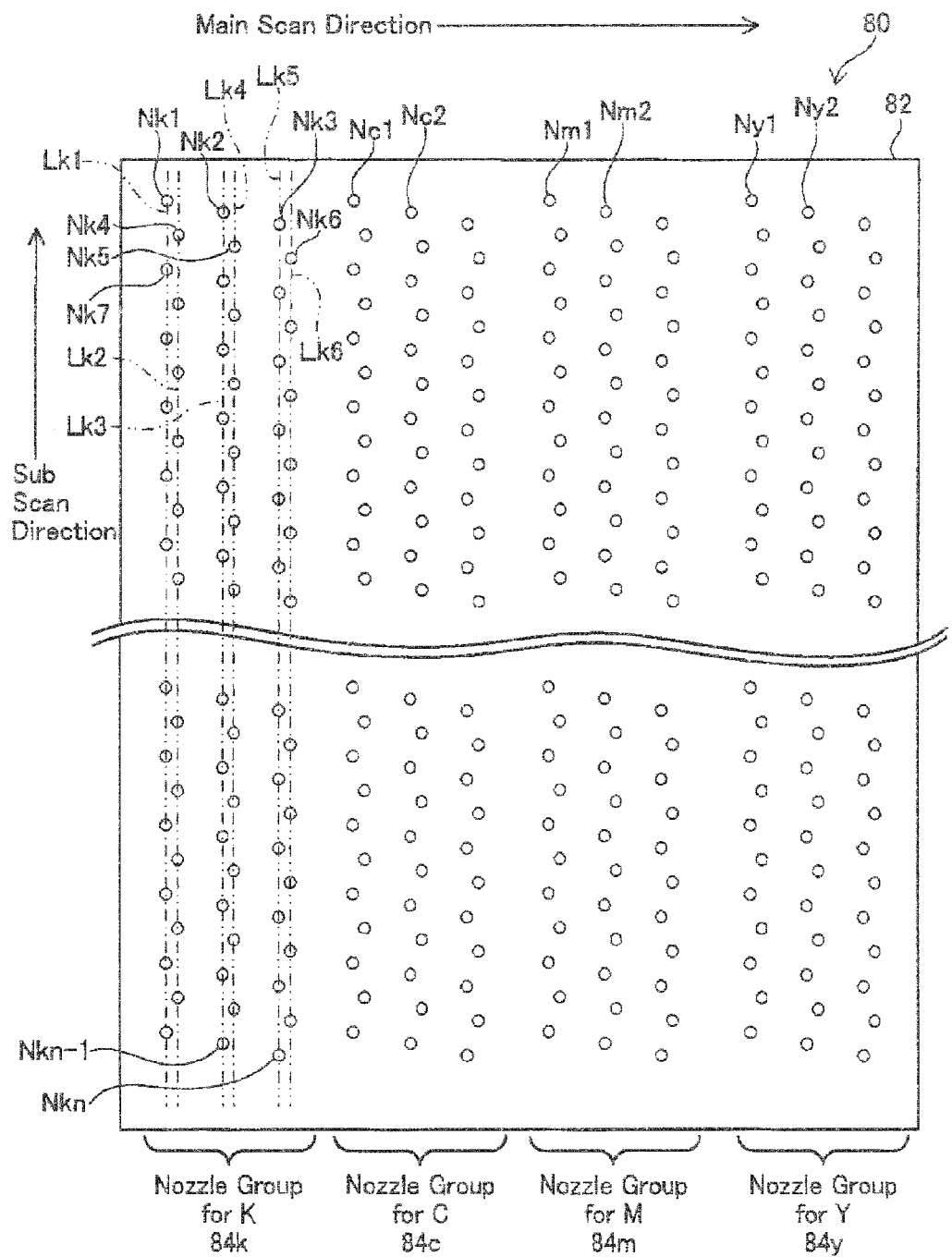
FIG. 2 shows a plan view of a nozzle surface of a print head.

As shown in FIG. 2, the print head 80 comprises a nozzle surface 82 having three nozzle groups 84c, 84m, 84y for discharging ink droplets of three types of chromatic colors (cyan, magenta, yellow) and one nozzle group 84k for discharging black ink droplets. The nozzle group for K 84k comprises n (n being an integer equal to or more than 2) nozzles for K. The nozzle group for K 84k forms six nozzle lines Lk1 to Lk6 extending in the sub scan direction. The n nozzles for K included in the nozzle group for K 84k belong to one of the six nozzle lines Lk1, etc. For example, the nozzles for K Nk1, Nk7, etc. belong to nozzle line Lk1, the nozzles for K Nk4, etc. belong to nozzle line Lk2, and the nozzles for K Nk2, etc. belong to nozzle line Lk3. Between two adjacent nozzles for K belonging to one nozzle line (e.g., the nozzle for K Nk1 and the nozzle for K Nk7 belonging to the nozzle line Lk1), five nozzles for K (e.g., NK2 to NK6) belonging to the other five nozzle lines are positioned in the sub scan direction. Moreover, in the present specification, "Nk1" has been adopted as the reference number of the nozzle for K which, in the nozzle group for K 84k, is positioned at the furthest downstream side in the sub scan direction (at the upper side of FIG. 2), and the reference number of the nozzles for K increases (e.g., Nk2, Nk3, . . . ) as one moves toward the upstream side in the sub scan direction (toward the lower side of FIG. 2).

Nozzle groups 84c, etc. corresponding to the other colors have the same configuration as the nozzle group for K 84k. Consequently, a total of 4n nozzles are formed in the nozzle surface 82. Moreover, below, all the nozzles that discharge the four colors CMYK of ink droplets are called "4n nozzles". The reference numbers are set for the other color nozzle groups 84c, etc. as in the case for the nozzle group for K 84k. Moreover, since the four nozzle groups 84k, etc. have the same configuration, the four nozzles corresponding to the four colors CMYK are arranged in the same position in the sub scan direction. For example, the four nozzles Nk1, Nc1, Nm1, Ny1 are arranged in the same position in the sub scan direction, and the four nozzles Nk2, Nc2, Nm2, Ny2 are arranged in the same position in the sub scan direction.

The storing unit 56 stores a characteristic data table 60 and the program 64. The program 64 includes a program for printing to be executed by the print performing unit 70. As shown in FIG. 3, for each of the 4n nozzles formed in the print head 80, an association of a nozzle number of the nozzle and characteristic data related to a discharging volume of the ink droplets discharged from that nozzle is registered in the characteristic data table 60. In the characteristic data table 60 of FIG. 3, the reference number of the nozzle (Nk1, etc. of FIG. 2) is adopted as the nozzle number of the nozzle. For example, characteristic data "6" corresponding to the nozzle number Nk1 indicates the characteristic data of the nozzle for K Nk1 (see FIG. 2) for discharging black ink droplets. The characteristic data registered in the characteristic data table 60 is examined in advance by the manufacturer of the printer 50. Specifically, the characteristic data is examined by the following method.

Although not shown, the print head 80 comprises an actuator unit for discharging the ink droplets from the 4n nozzles. The actuator unit comprises 4n individual electrodes corresponding to the 4n nozzles. When the driving signal is supplied to the individual electrode, one ink droplet is discharged from the nozzle corresponding to that individual electrode. The manufacturer of the printer 50 supplies one driving signal to each of the n individual electrodes corresponding to the n nozzles for K belonging to the nozzle group for K 84k. Moreover, the n driving signals that are supplied here are identical signals. When the n driving signals are supplied, n black ink droplets are discharged toward a predetermined medium from the n nozzles for K. Consequently, n black dots corresponding to the n nozzles for K are formed on the predetermined medium.

For each of the n black dots, the manufacturer measures the density of the dot (e.g., the density of black per unit area). The manufacturer decides, in the nozzle group for K 84k, that the density of a specific black dot having the lowest density is the maximum value "255" of the 256 tones. Next, using the black dot that has the lowest density (called "specific black dot" below) as the standard of density, the manufacturer identifies the density of the dots formed by the other nozzles for K. Thereby, the density of the dots formed by the other nozzles for K is identified at a value equal to or more than 255.

Then, for each of the n nozzles for K, the manufacturer decides the characteristic data of the nozzle for K based on the difference between the density of the dot formed by the nozzle for K and the density of the specific black dot having the lowest density (i.e., 255). Thus, the characteristic data of the nozzle for K that forms the specific dot is decided to be zero. The characteristic data of the other nozzles for K is decided to be a value equal to or more than zero. For example, the characteristic data corresponding to the nozzle number Nk1 shown in FIG. 3 is "6". This means that the difference between the density "261" of the dot formed by the nozzle for K Nk1 and the density "255" of the specific black dot is "6". The manufacturer decides the characteristic data of the nozzles for each of cyan, magenta, yellow in the same way as for black. The manufacturer generates the characteristic data table 60 based on the examination results, and stores the characteristic data table 60 in the storing unit 56. The characteristic data table 60 is already stored in the printer 50 at the shipment stage of the printer 50.

(First Print Mode)

Next, a first print mode in which the print performing unit 70 of the printer 50 can operate will be described. By executing a binary data generating process (to be described: see FIG. 5), the control unit 30 of the PC 10 generates binary data (data indicating ON or OFF of a dot), and supplies the binary data to the printer 50. In the present embodiment, in case the binary data is supplied from the PC 10, the print performing unit 70 of the printer 50 operates in the first print mode.

Pk1, Pk2, etc. shown in FIG. 4 indicate a projected point acquired by projecting the nozzles for K Nk1, Nk2, etc. that constitute the nozzle group for K 84k along the main scan direction in a case where a projection line PL that extends along the sub scan direction has been set. During one main scan of the print head 80, the print performing unit 70 discharges ink droplets from the nozzles for K Nk1, etc. based on the binary data. Consequently, e.g., a plurality of black dots aligned along the main scan direction is formed on the print medium by a plurality of black ink droplets discharged from the nozzle for K Nk1. Similarly, a plurality of black dots aligned along the main scan direction is formed on the print medium by a plurality of black ink droplets discharged from the nozzle for K Nk2. In case of monochrome printing, a line of the plurality of black dots formed by one nozzle for K in one main scan of the print head 80 is called "one raster". Therefore, the rasters extend along the main scan direction. In case of monochrome printing, e.g., the seven nozzles for K Nk1 to Nk7 form seven rasters R1 to R7 in one main scan of the print head 80.

As described above, e.g., the four nozzles Nk1, Nc1, Nm1, Ny1 are arranged in the same position in the sub scan direction (see FIG. 2). Consequently, in case of color printing, the four nozzles Nk1, Nc1, Nm1, Ny1 form dots at the same position in the sub scan direction in one main scan of the print head 80. Therefore, in case of color printing, a line of a plurality of CMYK dots formed by the four nozzles Nk1, Nc1, Nm1, Ny1 in one main scan of the print head 80 is called "one raster".

In the first print mode, n rasters aligned along the sub scan direction are formed in the first main scan of the print head 80. When the first main scan of the print head 80 ends, the print performing unit 70 transports the print medium. In the first print mode, a first distance is adopted as this transporting distance. The first distance is the distance of n nozzle pitches. One nozzle pitch is the distance between two nozzles (e.g., Nk1 and Nk2) that are adjacent in the sub scan direction. That is, one nozzle pitch is the distance between two projected points (e.g., Pk1 and Pk2) that are adjacent. Next, the print performing unit 70 performs a second main scan of the print head 80. Thereby, n rasters are newly formed. The print performing unit 70 repeats the combination of transporting the print medium for the first distance and performing the main scan of the print head 80. Thereby, an image represented by the binary data is printed on the print medium.

(Binary Data Generating Process of PC 10)

Next, processes performed by the control unit 30 of the PC 10 will be described. The user selects desired data, and can perform an operation on the operation unit 12 to print an image represented by the data. The operation includes an operation in which the user selects print resolution. In the present embodiment, the contents of the process will be described using the case where RGB bitmap format image data (called "RGB image data" below) has been selected by the user. In a case where other format data (e.g., text data, bitmap format image data other than RGB, composite text and bitmap data, etc.) has been selected, the control unit 30 converts the data selected by the user into RGB image data using a known method. When the above operation has been executed, the control unit 30 executes the binary data generating process of FIG. 5 in accordance with the printer driver 24.

In S10, the first generating unit 32 (see FIG. 1) acquires the RGB image data, and stores the RGB image data in the work area 22. Next, in S12, the first generating unit 32 sends a predetermined command to the printer 50 for acquiring the characteristic data table 60 stored in the printer 50. The printer 50 sends the characteristic data table 60 stored in the storing unit 56 to the PC 10 in accordance with the predetermined command. Thereby, the first generating unit 32 acquires the characteristic data table 60. The first generating unit 32 stores the characteristic data table 60 in the work area 22.

Next, in S14, the first generating unit 32 uses a known method to generate converted RGB image data having a resolution corresponding to the print resolution selected by the user by means of executing a resolution conversion process on the RGB image data. Converted RGB image data 200 shown in FIG. 6 is acquired by the resolution conversion process. Pixels 207, 208, etc. within the converted RGB image data 200 consist of an R value (e.g., $R(i,j)$), a G value (e.g., $G(i,j)$), and a B value (e.g., $B(i,j)$). The R value, G value and B value are each multivalue data of the 256 tones (0 to 255). Moreover, the x coordinate in the pixels of FIG. 6 indicates the column number of the pixels, and the y coordinate indicates the line number of the pixels.

Next, in S16, the first generating unit 32 executes a color conversion process on the converted RGB image data 200 so as to generate CMYK bitmap format image data (called "CMYK image data" below). CMYK image data 210 shown in FIG. 7 is acquired by the color conversion process of S16. One pixel (e.g., pixel 217) described in CMYK format is acquired from one pixel (e.g., pixel 207) in the converted RGB image data 200. Consequently, the number of pixels of the CMYK image data 210 is identical to the number of pixels of the converted RGB image data 200. Pixels 217, 218, etc. within the CMYK image data 210 consist of a C value (e.g., C(i, j)), an M value (e.g., M(i, j)), a Y value (e.g., Y(i, j)) and a K value (e.g., K(i, j)). The C value, M value, Y value and K value are each multivalue data of the 256 tones (0 to 255). Moreover, the x coordinate in the pixels of FIG. 7 indicates the column number of the pixels, and the y coordinate indicates the line number of the pixels.

Next, the halftone process unit 34 (see FIG. 1) executes a halftone process using the CMYK image data 210. The halftone process includes the processes of S18 to S40. In S18, the correcting unit 36 of the halftone process unit 34 (see FIG. 1) identifies one pixel within the CMYK image data 210. The identification sequence of pixels in S18 is determined in advance. Specifically, in the first process of S18, the correcting unit 36 identifies one pixel belonging to the leftmost column from among the plurality of pixels belonging to the topmost line within the CMYK image data 210 of FIG. 7. In the second and subsequent processes of S18, the correcting unit 36 identifies one pixel which belongs to the same line as the pixel identified previously (called "previous identified pixel" below), and which is to the right of the previous identified pixel. Moreover, in a case where the previous identified pixel belongs to the rightmost column, the correcting unit 36 identifies one pixel belonging to the leftmost column from among the plurality of pixels belonging to the line that is one line below that of the previous identified pixel. Below, the one pixel identified in S18 is called a "target pixel".

Next, in S20, the correcting unit 36 identifies one value (e.g., the K value) from among the four values CMYK that constitute the target pixel. Below, the one value identified in S20 is called a "PV (Pixel Value)".

Next, in S22, the correcting unit 36 corrects the PV identified in S20. Specifically, the correcting unit 36 corrects the PV of the target pixel using M1 pieces of error value calculated for M1 (M1 equal to or more than 2) pieces of peripheral pixels positioned at a periphery of the target pixel. These M1 pieces of peripheral pixels are within the processed pixel groups for which the process S20 to S36 has ended prior to the target pixel. For example, in a case where the pixel 217 of FIG. 8 is the target pixel, within the plurality of pixels belonging to the line that includes the pixel 217, the process S20 to S36 has ended for pixels 215, 216, etc. that are positioned to the left of the pixel 217, and the process S20 to S36 has ended for all the pixels 211 to 214, etc. belonging to the line above the pixel 217. Consequently, four error values corresponding to CMYK have been calculated in S34 (to be described) for the pixels 211 to 216, etc. For example, an error value corresponding to C, an error value corresponding to M, an error value corresponding to Y, and an error value corresponding to K have been calculated for the pixel 216. Moreover, in FIG. 8, for convenience of illustration, the four error values corresponding to the four colors CMYK are represented without distinction by "ΔE". Moreover, below, e.g., the error value corresponding to K may be represented as "ΔEk".

In the present embodiment, the halftone process unit 34 executes a halftone process in accordance with the error diffusion method using an error diffusion matrix 250 of FIG. 8. In the error diffusion matrix 250, an error diffusion coefficient "1" is adopted for the pixel to the left of the target pixel, and an error diffusion coefficient "1" is adopted for the pixel one above the target pixel. In this case, in S22, the correcting unit 36 adopts two pixels including the pixel 216 to the left of the target pixel 217 and the pixel 213 one above the target pixel 217 as the M1 pieces of peripheral pixels positioned at the periphery of the target pixel 217.

The correcting unit 36 identifies one error value (e.g., the error value corresponding to K $\Delta Ek(i, j-1)$) from among four error values $\Delta E(i, j-1)$ which have been calculated for the peripheral pixel 213 from among the two peripheral pixels 213, 216. This one error value corresponds to the color of the PV (e.g., K) of the current correction target. Similarly, the correcting unit 36 identifies one error value (e.g., $\Delta Ek(i-1, j)$) from among the four error values $\Delta E(i-1, j)$ that have been calculated for the peripheral pixel 216 from among the two peripheral pixels 213, 216. This one error value corresponds to the color of the PV of the current correction target. Consequently, two error values (e.g., $\Delta Ek(i, j-1)$, $\Delta Ek(i-1, j)$) corresponding to the color (e.g., K) of the PV of the current correction target are identified.

Next, using the two identified error values, the correcting unit 36 calculates a corrected value PV' by correcting the PV of the target pixel 217 in accordance with the formula shown in the pixel 217 of FIG. 8. For example, in a case where the PV(i, j) of the target pixel 217 is the K value (K(i, j)), the correcting unit 36 calculates a multiplied value by multiplying the error value $\Delta Ek(i, j-1)$ of the peripheral pixel 213 with a coefficient ½ corresponding to the peripheral pixel 213. Moreover, the "2" of the coefficient ½ is the summation of M1 (i.e., two) pieces of error diffusion coefficients shown in the error diffusion matrix 250, and the "1" of the coefficient ½ is the error diffusion coefficient corresponding to the peripheral pixel 213. Similarly, the correcting unit 36 calculates a multiplied value by multiplying the error value $\Delta Ek(i-1, j)$ of the peripheral pixel 216 with a coefficient ½ corresponding to the peripheral pixel 216. Next, the correcting unit 36 calculates a corrected value K'(i, j) (i.e., the PV'(i, j)) by calculating the summation of the K value (i, j) (i.e., the PV(i, j)) of the target pixel 217 and the two multiplied values that were calculated for the two peripheral pixels 213, 216.

Next, in S24, the deciding unit 38 (see FIG. 1) determines whether the corrected value PV' (e.g., K'(i, j)) acquired in S22 is larger than a predetermined threshold Th (e.g., 128). In a case where the corrected value PV' is larger than the threshold Th (in case of YES in S24), the deciding unit 38 decides that a dot of the color corresponding to the corrected value PV' is to be formed on the print medium. In this case, in S26, the value of a new pixel in the same position as the target pixel is stored in the work area 22 by the deciding unit 38. The value stored here is a dot output value "1" of the color corresponding to the corrected value PV'. For example, in a case where the pixel 217 of FIG. 9 is the target pixel and the corrected value PV' of the target pixel 217 is K'(i, j), in S26 the deciding unit 38 stores "K=1" in the work area 22 as the value of the new pixel in the same position as the target pixel 217. When the binary data including this type of information is supplied to the printer 50, black ink droplets are discharged toward a position on the print medium corresponding to the target pixel 217. That is, a black dot is formed at the position on the print medium corresponding to the target pixel 217. When S26 ends, the process continues to S30.

On the other hand, in a case where the corrected value PV' is equal to or below the threshold Th (in case of NO in S24), the deciding unit 38 decides that a dot of the color corresponding to the corrected value PV' is not to be formed on the print medium. Next, in S28, the value of a new pixel in the same position as the target pixel is stored in the work area 22 by the deciding unit 38. The value stored here is a dot output value "0" of the color corresponding to the corrected value PV'. For example, in case the pixel 218 of FIG. 9 is the target pixel and the corrected value PV' of the target pixel 218 is KV+1, j), in S28 the deciding unit 38 stores "K=0" in the work area 22 as the value of the new pixel in the same position as the target pixel 218. When the binary data including this type of information is supplied to the printer 50, black ink droplets are not discharged toward a position on the print medium corresponding to the target pixel 218. That is, a black dot is not formed at the position on the print medium corresponding to the target pixel 218. When S28 ends, S30 and S32 are skipped and the process continues to S34.

Further, e.g., in a case where the C value was identified as the PV in S20, in S26 "C=1" is stored as the value of the new pixel in the same position as the target pixel, and in S28 "C=0" is stored as the value of the new pixel in the same position as the target pixel. In the former case, a cyan dot is formed at a position on the print medium corresponding to the target pixel, and in the latter case, a cyan dot is not formed at a position on the print medium corresponding to the target pixel. In a case where an M value or Y value was identified in S20, also, the same type of process is executed as in the case where a K value or C value was identified in S20.

In S30, the compensating unit 40 (see FIG. 1) identifies a nozzle number (called "target nozzle number" below) of the nozzle (called "target nozzle" below) that forms the dot of the color (e.g., K) corresponding to the PV' at a position on the print medium corresponding to the target pixel. In S30, further, the compensating unit 40 identifies a nozzle number (called "first neighbor nozzle number" below) of a nozzle (called "first neighbor nozzle" below) that forms a first neighbor raster, this first neighbor raster being in a neighboring position to the raster formed by the target nozzle. Moreover, e.g., in case the color corresponding to the PV' is K, the nozzle for K is identified as the target nozzle. Below, in case a nozzle for K is to be identified as the target nozzle, this is called a "target nozzle for K". Similarly, in case a nozzle for K is to be identified as the first neighbor nozzle, this is called a "first neighbor nozzle for K". A method for identifying the target nozzle number for K and the first neighbor nozzle number for K will be described in detail next.

As described above, the first print mode is realized as shown in FIG. 4. That is, in the first main scan, the nozzles for K Nk1 to Nkn form n rasters corresponding to 1 to n lines of the CMYK image data 210. Further, the transporting distance of the first print mode (the first distance) is the distance of n nozzle pitches. Based on the above, one target nozzle for K for forming one raster corresponding to the j line of the CMYK image data 210 can be identified. A first nozzle number for K table for identifying the target nozzle number for K from the line number of the line to which the pixels of the CMYK image data 210 belong has been registered in advance in the printer driver 24 (see FIG. 1). For example, in case the line number of the target pixel 217 is "j", in S30 the compensating unit 40 identifies the target nozzle number for K based on the line number "j" and the first nozzle number for K table. In the example of FIG. 4, "Nk4" is identified as the target nozzle number for K.

Further, in a case where the line number of the target pixel 217 is "j", the compensating unit 40 identifies the first neighbor nozzle number for K based on the line number "j−1" and the first nozzle number for K table. For example, in a case where the target nozzle for K is the nozzle for K Nk4 of FIG. 4, the compensating unit 40 identifies the nozzle number for K "Nk3" of nozzle Nk3 as the first neighbor nozzle number for K.

As is clear from FIG. 4, the first neighbor nozzle for K Nk3 is a nozzle that forms a first neighbor raster R3 adjacent to a target raster R4 formed by the target nozzle for K Nk4. In the sub scan direction, the first neighbor nozzle for K Nk3 is positioned downstream from the target nozzle for K Nk4. Further, in a case where the line number of the target pixel 217 is "j", the first neighbor nozzle for K Nk3 is identified based on the line number "j−1". As described above, when the target pixel 217 is identified from the CMYK image data 210 in S18 of FIG. 5, the target pixels are identified in the order from top to bottom of FIGS. 7 and 8. Consequently, at the stage when the process S20 to S36 is executed for the target pixel 217 belonging to the j line of the CMYK image data 210, the error value has already been calculated for the pixels 212 to 214, etc. belonging to the j−1 line. Consequently, the first neighbor nozzle for K Nk3 is a nozzle that forms a dot on the print medium at a position corresponding to the pixels 212 to 214, etc., for which the error value has been calculated before the target pixel 217 of FIG. 8.

As with the case of the first nozzle number for K table, a first nozzle number table is registered in advance in the printer driver 24 for each of the three types of chromatic color CMY. In a case where the color corresponding to the PV identified in S20 is any of the three types of chromatic color CMY, the compensating unit 40 identifies the target nozzle number and the first neighbor nozzle number, as in the case of K above. For example, in case the color corresponding to the PV identified in S20 is C, the compensating unit 40 identifies a target nozzle number for C and a first neighbor nozzle number for C using a first nozzle number table for C.

When S30 of FIG. 5 ends, the process proceeds to S32. The characteristic data table 60 (see FIG. 3) acquired from the printer 50 in S12 is stored in the work area 22. For example, in case the color corresponding to the PV identified in S20 is K, in S32 the compensating unit 40 acquires characteristic data corresponding to the target nozzle number for K identified in S30 from the characteristic data table 60 in the work area 22. Further, the compensating unit 40 acquires characteristic data corresponding to the first neighbor nozzle number for K identified in S30 from the characteristic data table 60. For example, in a case where the nozzle number of the target nozzle for K is "Nk4" and the nozzle number of the first neighbor nozzle for K is "Nk3", the compensating unit 40 acquires the characteristic data "2.0" corresponding to the target nozzle number for K "Nk4" and acquires the characteristic data "1.5" corresponding to the first neighbor nozzle number for K "Nk3" (see FIG. 3).

Further, as described above, in S30, in a case where the line number of the target pixel is "j", the compensating unit 40 identifies the first neighbor nozzle for K corresponding to the line number "j−1". In case j=1, the line number "j−1" becomes zero, and consequently in S30 the compensating unit 40 cannot identify the first neighbor nozzle for K corresponding to the line number "j−1". In this case, in S32, for convenience, the compensating unit 40 acquires "0" as the characteristic data corresponding to the first neighbor nozzle number for K.

In S32, further, the compensating unit 40 calculates target correcting data. As shown in FIG. 9, the target correcting data is $255 + Dtarget + x \cdot (Dtarget - Dpre1)$. Here, "255" is the maximum value of the 256 tones, "x" is a predetermined coefficient, "Dtarget" is the characteristic data corresponding to the target nozzle, and "Dpre1" is the characteristic data corresponding to the first neighbor nozzle. For example, in a case where the characteristic data "2.0" corresponding to the target nozzle number for K "Nk4" and the characteristic data "1.5" corresponding to the first neighbor nozzle number for K "Nk3" is acquired in S30, in S32 the compensating unit 40 calculates the target correcting data by calculating 255+2.0+ x·(2.0−1.5).

The coefficient x is a numerical value in which a design value r has been multiplied by a numerical value in which the denominator is the summation of the M1 pieces of error diffusion coefficients corresponding to the M1 pieces of peripheral pixels shown in the error diffusion matrix, and in which the numerator is the summation of M2 pieces of error diffusion coefficients corresponding to M2 pieces of peripheral pixels (M2<M1) belonging to a line other than the line to which the target pixel belongs, these M2 pieces of peripheral pixels being within the M1 pieces of peripheral pixels shown in the error diffusion matrix. For example, in the error diffusion matrix 250 of FIG. 8, in a case where the pixel 217 is the target pixel, the two pixels 213, 216 are the M1 (M1=2) pieces of peripheral pixels, and the one pixel 213 is the M2 (M2=1) pieces of peripheral pixels. Consequently, the summation of the M1 pieces of error diffusion coefficients is "2 (=1+1)", and the summation of the M2 pieces of error diffusion coefficients corresponding to the M2 pieces of peripheral pixels is "1". Consequently, the coefficient x is "½×r". Moreover, the coefficient x may be decided by the compensating unit 40 executing a calculation based on the error diffusion matrix 250, or may be decided in advance by the manufacturer of the printer 50 and registered in advance in the printer driver 24.

Further, the design value r is a value decided in advance by the manufacturer of the printer 50. The design value r may be any value that satisfies 0≤r≤3. Generally speaking, the coefficient x may be decided based on a ratio of the summation of the M1 pieces of error diffusion coefficients and the summation of the M2 pieces of error diffusion coefficients. Moreover, in a variant, the coefficient x may be decided based on only the summation of the M1 pieces of error diffusion coefficients (e.g., x=1/the summation of M1 pieces of error diffusion coefficients). More generally speaking, the coefficient x may be decided based on the M1 pieces of error diffusion coefficients.

When S32 ends, the process proceeds to S34. Further, in case S28 is executed, S30 and S32 are skipped and the process proceeds to S34. In S34, the compensating unit 40 calculates the error value. The process S34 changes in accordance with the results determined in S24. First, the process S34 will be described for the case that YES was determined in S24 (the case that S26, S30, S32 were executed). The compensating unit 40 calculates the error value ΔE by subtracting the target correcting data acquired in S32 from the corrected value PV' acquired in S22. A formula for calculating the error value in this manner is shown in the pixel 217 of FIG. 9. That is, for the target pixel 217, in a case where the PV'(i, j) acquired in S22 is larger than the threshold Th (in case of YES in S24), the compensating unit 40 calculates the error value ΔE(i, j) corresponding to the pixel 217 by subtracting the target correcting data from the PV'(i, j). For example, in a case where the color corresponding to the PV identified in S20 is K, the error value corresponding to K of the pixel 217 is calculated. Similarly, in a case where the color corresponding to the PV identified in S20 is another color, the error value corresponding to the other color of the pixel 217 is calculated.

Next, the process S34 will be described for the case that NO was determined in S24 (the case that S28 was executed). In case of NO in S24, the compensating unit 40 identifies the corrected value PV' acquired in S22 as the error value. A formula for calculating the error value in this manner is shown in the pixel 218 of FIG. 9. That is, for the target pixel 218, in a case where the PV(i+1, j) acquired in S22 is smaller than the threshold Th (in case of NO in S24), the compensating unit 40 identifies the error value ΔE(i+1, j) corresponding to the pixel 218. That is, the compensating unit 40 calculates the error value using the corrected pixel value PV' and without using the target correcting data.

Upon ending S34, the compensating unit 40 stores, in the work area 22, the error value (e.g., ΔE(i, j)) identified in S34 as the error value corresponding to the target pixel (S36). The error value stored here is used in the process S22 which is executed later. For example, in a case where the error value ΔE(i, j) corresponding to K of the pixel 217 has been stored in S36, this is used in S22 when calculating K'(i+1, j) corresponding to the K value of the pixel 218.

As described above, in S34 performed in the case of dot output value=1, the compensating unit 40 calculates the error value ΔE using the difference between characteristic data Dtarget corresponding to the target nozzle and characteristic data Dpre1 corresponding to the first neighbor nozzle by means of the formula ΔE=PV'-target correcting data (255+ Dtarget+x·(Dtarget-Dpre1)). Here, the characteristic data corresponding to the nozzle with the minimum ink discharging volume (called "minimum characteristic data" below) is "0". This means that the density of the dot formed by the nozzle with the minimum ink discharging volume is assumed to be "255". That is, the use of "255+Dtarget+x·(Dtarget− Dpre1)" as the target correcting data assumes that the density of the dot formed by the target nozzle is "255+Dtarget+x· (Dtarget−Dpre1)". In S34, the difference between the value PV' of the target pixel that is actually represented and the assumed dot density "255+Dtarget+x·(Dtarget−Dpre1)" is calculated as the error value ΔE. This difference is diffused, in the process S22, among the peripheral pixels positioned at the periphery of the target pixel.

Further, in S34 performed in the case of dot output value=0, the compensating unit 40 calculates the error value ΔE by means of the formula ΔE=PV'. That is, the difference between the value PV' of the target pixel that is actually represented and the density "0" when the dot is not formed is calculated as the error value ΔE. This difference is diffused, in the process S22, among the peripheral pixels positioned at the periphery of the target pixel.

Next, in S38, the halftone process unit 34 determines whether the process S20 to S36 has been executed for all the four CMYK pixel values (C value, M value, Y value, K value) that constitute the target pixel. In case of NO here, the halftone process unit 34 returns to S20 and identifies a value for which the process S20 to S36 has not been executed from among the four CMYK values that constitute the target pixel. In case of YES in S38, in S40 the halftone process unit 34 determines whether the process S18 to S36 has been executed for all the pixels that constitute the CMYK image data 210. In case of NO here, the halftone process unit 34 returns to S18, and identifies the pixel following the current target pixel (basically, the pixel to the right) as the new target pixel.

In case of YES in S40, this means that the binary data has been completed. As is clear from the above description, one new pixel consisting of C=0 or 1, M=0 or 1, Y=0 or 1, and K=0 or 1 (i.e., a pixel that constitutes binary data) is generated from one pixel that constitutes the CMYK image data 210. Consequently, the number of pixels of the binary data is identical to the number of pixels of the CMYK image data 210.

Next, in S42, the supplying unit 44 (see FIG. 1) supplies the binary data to the printer 50. Consequently, the print performing unit 70 of the printer 50 performs a printing process in accordance with the binary data. That is, the print performing unit 70 supplies a driving signal to the individual electrode corresponding to the nozzle for K that is to form a dot such that a black dot is formed at a position on the print medium corresponding to the pixel indicating K=1 included in the binary data. Similarly, the print performing unit 70 supplies the driving signal such that other color dots are formed in accordance with the binary data. Consequently, an image represented by the RGB image data acquired in S10 of FIG. 5 (i.e., an image represented by the converted RGB image data 200 acquired in S14, an image represented by the CMYK image data 210 acquired in S16, an image represented by the binary data) is formed on the print medium.

(Effects of First Embodiment)

Figure 12B:
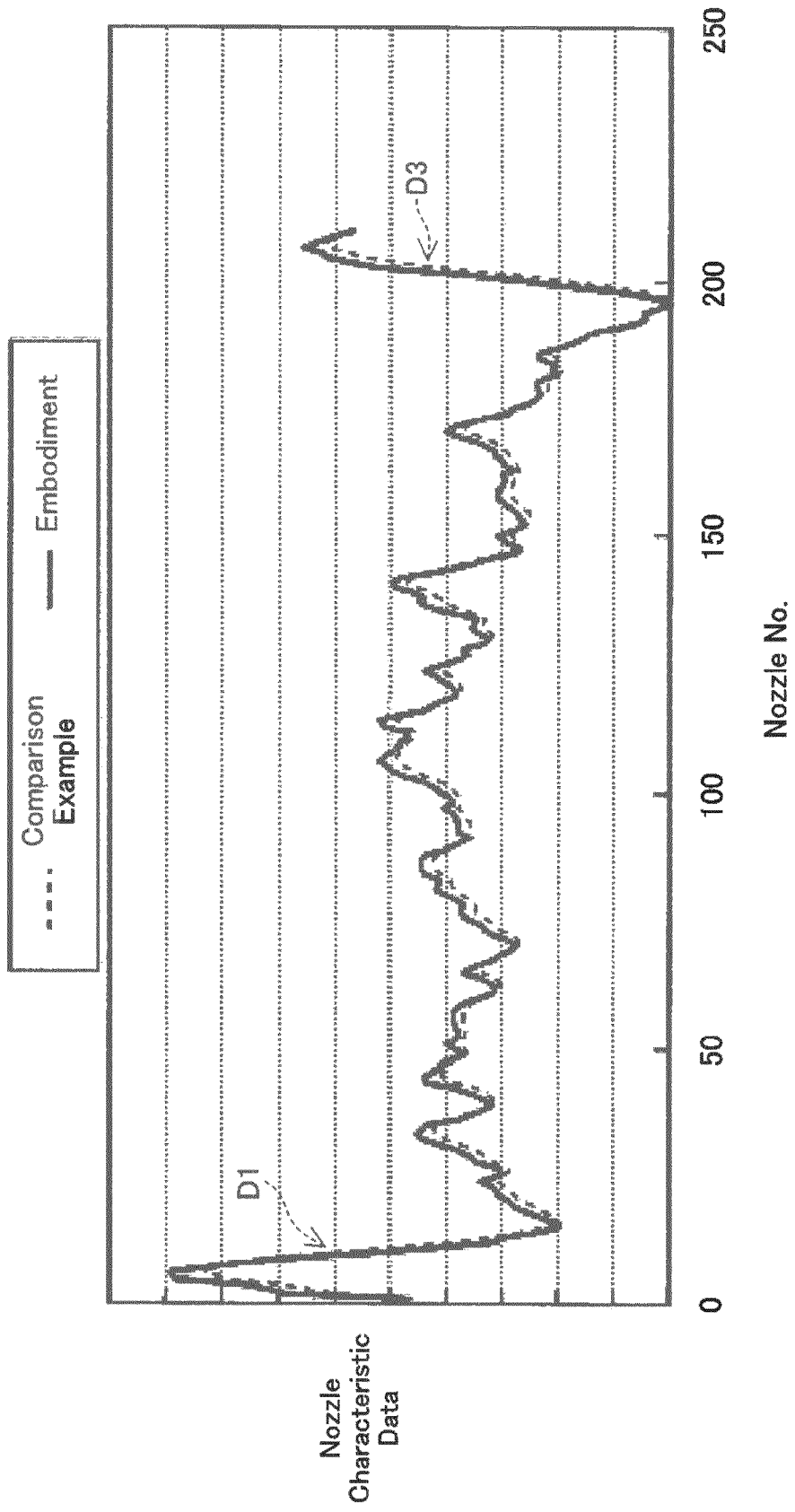
FIG. 12B shows graph for explaining the results of the first embodiment.

Effects of the present embodiment will be described with reference to FIGS. 12A and 12B. Print result simulations were executed using monochrome mode in which, for all the pixels, the RGB image data indicating black hue is color converted into monochromatic K. The graph corresponding to the comparison example of FIG. 12B shows a plurality of pieces of characteristic data corresponding to a plurality of nozzles for K used in the present simulation. The graph corresponding to the comparison example of FIG. 12A shows the output density of the rasters in a case where the simulation was executed based on the binary data generated by adopting "255+Dtarget" as the target correcting data in the binary data generating process of FIG. 5. Moreover, the rasters indicated by the raster numbers of FIG. 12A are the rasters formed by nozzles having the same nozzle numbers as the raster numbers. For example, the raster indicated by raster number 50 of FIG. 12A is a raster formed by a nozzle having nozzle number 50. Further, the output density of the rasters is a value acquired by multiplying "255+characteristic data corresponding to the nozzle that forms the raster" by the number of dots that constitute the raster.

Here, in a case where the error diffusion method is used, the error value calculated for the target pixel is diffused among pixels processed after the target pixel. Consequently, the results of a compensation process for compensating for variability in the ink discharging volume of the plurality of nozzles for K (i.e., the error value calculated for the target pixel) will be reflected in the pixels processed after the target pixel, and therefore the compensation process is delayed. The effect of delay of the compensation process is prominent in the case of having a large variation in the characteristic data of the nozzles. Consequently, even if the compensation process for compensating for the variability in the ink discharging volume of the plurality of nozzles for K is executed using only the characteristic data of the target nozzle (i.e., using target correcting data=255+Dtarget), as in the comparison example, it was not possible to sufficiently compensate for the variability in the ink discharging volume of the nozzles when the characteristic data of the nozzles varied greatly.

For example, the characteristic data is greatly reduced in the portion shown by the arrow D1 of FIG. 12B. In this case, the output density greatly decreases, as in the portion shown by the arrow D2 of FIG. 12A. Similarly, e.g., the characteristic data is greatly increased in the portion shown by the arrow D3 of FIG. 12B. In this case, the output density greatly increases, as in the portion shown by the arrow D4 of FIG. 12A. Thus, in the comparison example, the variability in the ink discharging volume of the plurality of nozzles for K cannot be adequately compensated for, and high quality printing results cannot be obtained.

On the other hand, the graph corresponding to the embodiment of FIG. 12B is a graph in which the characteristic data corresponding to the nozzles for K has been corrected according to the correction formula "Dtarget+x·(Dtarget−Dpre1)". Further, the graph corresponding to the embodiment of FIG. 12A shows the output density of the rasters in a case where the simulation was executed based on the binary data generated by employing "255+Dtarget+x·(Dtarget−Dpre1)" as the target correcting data in the binary data generating process of FIG. 5.

In the present embodiment, Dtarget is corrected using the difference between Dtarget and Dpre1. Consequently, at a portion where the characteristic data is reduced D1, (i.e., a portion where Dtarget−Dpre1 assumes a minus value), the characteristic data "Dtarget+x·(Dtarget−Dpre1)" after correction becomes smaller than the characteristic data Dtarget before correction, and therefore the target correcting data becomes smaller. Consequently, the error value $\Delta E$ (=PV'-target correcting data) calculated in S34 of FIG. 5 becomes larger. When the error value $\Delta E$ becomes larger, the corrected value PV' of the peripheral pixel becomes larger, and therefore the output density of the peripheral pixel becomes larger. Therefore, the output density becomes larger, as in portion D2' of FIG. 12A, and consequently the difference in density between adjacent rasters grows smaller, and high quality printing results can be acquired.

Further, at a portion where the characteristic data is increased D3 (i.e., a portion where Dtarget−Dpre1 assumes a plus value), the characteristic data "Dtarget+x·(Dtarget−Dpre1)" after correction becomes larger than the characteristic data Dtarget before correction, and therefore the target correcting data becomes larger. Consequently, the error value $\Delta E$ (=PV'-target correcting data) calculated in S34 of FIG. 5 becomes smaller. When the error value $\Delta E$ becomes smaller, the corrected value PV' of the peripheral pixel become smaller and therefore the output density of the peripheral pixel becomes smaller. Therefore, the output density becomes smaller, as in portion D4' of FIG. 12A, and consequently the difference in density between adjacent rasters grows smaller, and high quality printing results can be acquired.

Thus, in the present embodiment, when executing the compensation process (S30 to S34 of FIG. 5) to compensate for the variability in ink discharging volume of the plurality of nozzles, the PC 10 uses the target correcting data acquired by using the difference between Dtarget and Dpre1. Thus, when the difference between Dtarget and Dpre1 is taken into account, the delay in the compensation process can be suppressed. Since the PC 10 uses the target correcting data which has taken the difference between Dtarget and Dpre1 into account, the variability in ink discharging volume of the plurality of nozzles can be adequately compensated for compared to the configuration in which target correcting data is used that does not take the above difference into account (the configuration of the comparison example of FIGS. 12A and 12B). Consequently, high quality printing results can be provided to the user.

(Corresponding Relationships)

Further, the PC 10 and the printer 50 are respectively examples of the "control device" and the "print performing unit". The CMYK image data 210 and the binary data generated in FIG. 5 are respectively examples of the "target image data" and the "first type of processed image data". The halftone process of S18 to S40 of FIG. 5 is an example of the "first type of image process". Dtarget, Dpre1, Dtarget−Dpre1 are respectively examples of the "target value", the "first value", and the "first difference". For example, in case the pixel 217 of FIG. 8 is the target pixel, the pixels 212 to 214 are an example of the "first pixel". Further, the error diffusion matrix 250 and x (½×design value r) are respectively examples of the "first error diffusion matrix" and the "first coefficient".

Second Embodiment

In the present embodiment, the halftone process unit 34 executes the halftone process in accordance with the error diffusion method using an error diffusion matrix 252 (see FIG. 8) instead of the error diffusion matrix 250. Specifically, in S22 of FIG. 5, the correcting unit 36 identifies the six pixels 211 to 216 as the M1 pieces of peripheral pixels positioned at the periphery of the target pixel 217. Next, for each of the six peripheral pixels 211 to 216, the correcting unit 36 identifies the one error value (e.g., the error value ΔEk corresponding to K) corresponding to the color (e.g., K) of the PV of the current correction target from among the four CMYK error values ΔE that have been calculated for the peripheral pixels. Consequently, six error values corresponding to the color of the PV of the current correction target are identified.

Next, the correcting unit 36 calculates the corrected value PV' by correcting the PV of the target pixel 217 using the six identified error values. For example, in case the PV(i, j) of the target pixel 217 is the K value (K(i, j)), in the present embodiment "⅛" or "⅖" is used as the coefficient to be multiplied with the error value. For example, the coefficient ⅛ is multiplied with the error value ΔEk(i−2, j) of the peripheral pixel 215, and the coefficient ⅖ is multiplied with the error value ΔEk(i−1, j) of the peripheral pixel 216. Here, the "8" of the coefficient ⅛ is the summation of the six error diffusion coefficients shown in the error diffusion matrix 252, and the "1" of the coefficient ⅛ is the error diffusion coefficient corresponding to the peripheral pixel 215. Further, the "8" of the coefficient ⅖ is the summation of the six error diffusion coefficients shown in the error diffusion matrix 252, and the "2" of the coefficient ⅖ is the error diffusion coefficient corresponding to the peripheral pixel 216.

Further, in S32 of FIG. 5, the compensating unit 40 calculates the target correcting data according to a formula shown in FIG. 10. The formula shown in FIG. 10 is the same as the formula shown in FIG. 9 of the first embodiment. However, in the present embodiment, the value of the coefficient x differs from that in the first embodiment. In the error diffusion matrix 252, in case the pixel 217 is the target pixel, the six pixels 211 to 216 are the M1 (M1=6) pieces of peripheral pixels, and the four pixels 211 to 214 are the M2 (M2=4) pieces of peripheral pixels. Consequently, the summation of the M1 pieces of error diffusion coefficients is "8 (=1+1+2+1+1+2)", and the summation of the M2 pieces of error diffusion coefficients corresponding to the M2 pieces of peripheral pixels is "5 (=1+1+2+1)". Consequently, the coefficient x is "⅝×r". The other processes are identical to the first embodiment.

In the present embodiment, due to using the coefficient x which is appropriate for the error diffusion matrix 252, the PC 10 can adequately compensate for the variability in ink discharging volume of the plurality of nozzles. Consequently, high quality printing results can be provided to the user. Moreover, in the present embodiment, the error diffusion matrix 252 and x (⅝×design value r) are respectively examples of the "first error diffusion matrix" and the "first coefficient".

Further, in a variant, the coefficient x may be a numerical value in which the design value r has been multiplied by a numerical value in which the denominator is the summation of the error diffusion coefficients corresponding to the peripheral pixels belonging to the line to which the target pixel belongs and belonging to the line that is one line above the said line and in which the numerator is the summation of the error diffusion coefficients corresponding to the peripheral pixels belonging to the line that is one line above the line to which the target pixel belongs. These peripheral pixels are within the M1 pieces of peripheral pixels shown in the error diffusion matrix. For example, in the error diffusion matrix 252 of FIG. 8, the denominator may be "7 (=1+2+1+2+1)", and the numerator may be "4 (=1+2+1)". That is, the coefficient x may be "4/7×r". Generally speaking, the coefficient x may be decided based on the error diffusion coefficient of the error diffusion matrix 252.

Third Embodiment

In the present embodiment, as in the second embodiment, the halftone process unit 34 executes the halftone process in accordance with the error diffusion method that uses the error diffusion matrix 252. In S30 of FIG. 5, the compensating unit 40 identifies not only the nozzle number of the target nozzle and the first neighbor nozzle number, but also the nozzle number (called "second neighbor nozzle number" below) of the nozzle (called "second neighbor nozzle" below) that forms a second neighbor raster at a neighboring position to the first neighbor raster. Moreover, below, in a case where the nozzle for K is identified as the second neighbor nozzle, this is called the "second neighbor nozzle for K".

Specifically, in a case where the line number of the target pixel is "j", the compensating unit 40 identifies the second neighbor nozzle number for K based on the line number "j−2" and the first nozzle number for K table. For example, in a case where the target nozzle for K is the nozzle for K Nk4 of FIG. 4, the compensating unit 40 identifies the nozzle number for K "Nk2" of the nozzle Nk2 as the second neighbor nozzle number for K.

As is clear from FIG. 4, the second neighbor nozzle for K Nk2 is a nozzle that forms a second neighbor raster R2 adjacent to the first neighbor raster R3 formed by the first neighbor nozzle for K Nk3. In the sub scan direction, the second neighbor nozzle for K Nk2 is positioned downstream from the first neighbor nozzle for K Nk3. Further, the error value has already been calculated for the pixels 211, etc. that belong to the j−2 line at the stage of executing the process S20 to S36 for the target pixel 217 that belongs to the j line of the CMYK image data 210. Consequently, the second neighbor nozzle for K Nk2 is a nozzle that forms a dot on the print medium at a position corresponding to the pixels 211, etc. whose error value is calculated before the target pixel 217.

Figure 11:
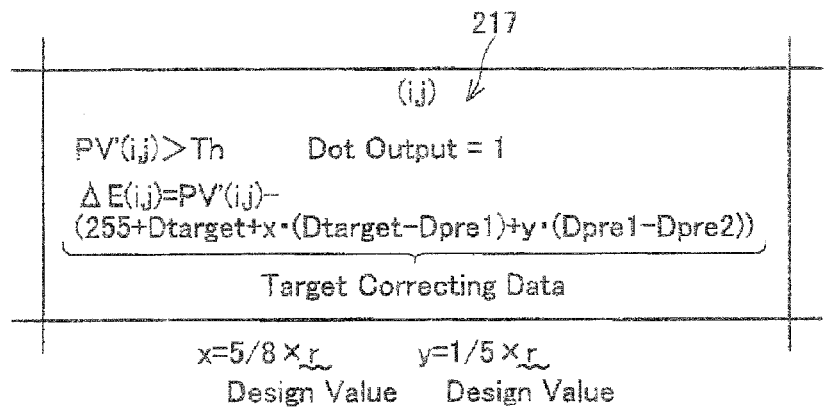
FIG. 11 shows a formula of a third embodiment for calculating the error value.

In S32, the compensating unit 40 acquires, from the characteristic data table 60 in the work area 22, not only the characteristic data corresponding to the target nozzle number for K and the characteristic data corresponding to the first neighbor nozzle number for K, but also characteristic data corresponding to the second neighbor nozzle number for K. In S32, further, the compensating unit 40 calculates the target correcting data according to a formula shown in FIG. 11 (target correcting data=255+Dtarget+x·(Dtarget−Dpre1)+y·(Dpre1−Dpre2)). Here, the elements other than "Dpre2" are the same as in the second embodiment, and "Dpre2" is the characteristic data corresponding to the second neighbor nozzle.

A coefficient y is a numerical value in which the design value r has been multiplied by a numerical value in which the denominator is the summation of M2 (M2<M1) pieces of error diffusion coefficients corresponding to the M2 pieces of peripheral pixels belonging to a line other than the line to which the target pixel belongs, and in which the numerator is the summation of M3 (M3<M2) pieces of error diffusion coefficients corresponding to M3 pieces of pixels belonging to a line other than the line that is one line above the line to which the target pixel belongs. The M2 pieces of peripheral pixels are within the M1 pieces of peripheral pixels shown by the error diffusion matrix. The M3 pieces of pixels are within the M2 pieces of peripheral pixels. For example, in the error diffusion matrix 252 of FIG. 8, in a case where the pixel 217 is the target pixel, the four pixels 211 to 214 are the M2 (M2=4) pieces of peripheral pixels, and the one pixel 211 is the M3 (M3=1) pieces of peripheral pixels. Consequently, the summation of the M2 pieces of error diffusion coefficients is "5 (=1+1+2+1)", and the summation of the M3 pieces of error diffusion coefficients corresponding to the M3 pieces of peripheral pixels is "1". Consequently, the coefficient y is "1/5×r". Moreover, the coefficient x "5/8×r" is larger than the coefficient y "1/5×r". The other processes are the same as in the first embodiment.

In the present embodiment, when executing the compensation process (S30 to S34 of FIG. 5) to compensate for the variability in ink discharging volume of the plurality of nozzles, the PC 10 uses the target correcting data acquired using not only the difference between Dtarget and Dpre1, but also the difference between Dpre1 and Dpre2. In particular, since the coefficient x is larger than the coefficient y, the target correcting data is more dependent on the difference between Dtarget and Dpre1 than on the difference between Dpre1 and Dpre2. That is, in the target correcting data, the difference in ink discharging volume between the target nozzle and the first neighbor nozzle has been taken into consideration the most and, further, the difference in ink discharging volume between the first neighbor nozzle and the second neighbor nozzle has also been taken into consideration. Therefore, the PC 10 can more adequately compensate for the variability in ink discharging volume of the plurality of nozzles, and consequently high quality printing results can be provided to the user.

In the present embodiment, Dpre2 and Dpre1−Dpre2 are respectively examples of the "second value" and the "second difference". Further, e.g., in a case where the pixel 217 of FIG. 8 is the target pixel, the pixel 211 is an example of the "second pixel". Further, the error diffusion matrix 252, x (5/8×design value r), and y (1/5×design value r) are respectively examples of the "first error diffusion matrix", the "first coefficient", and the "second coefficient".

Fourth Embodiment

Figure 13:
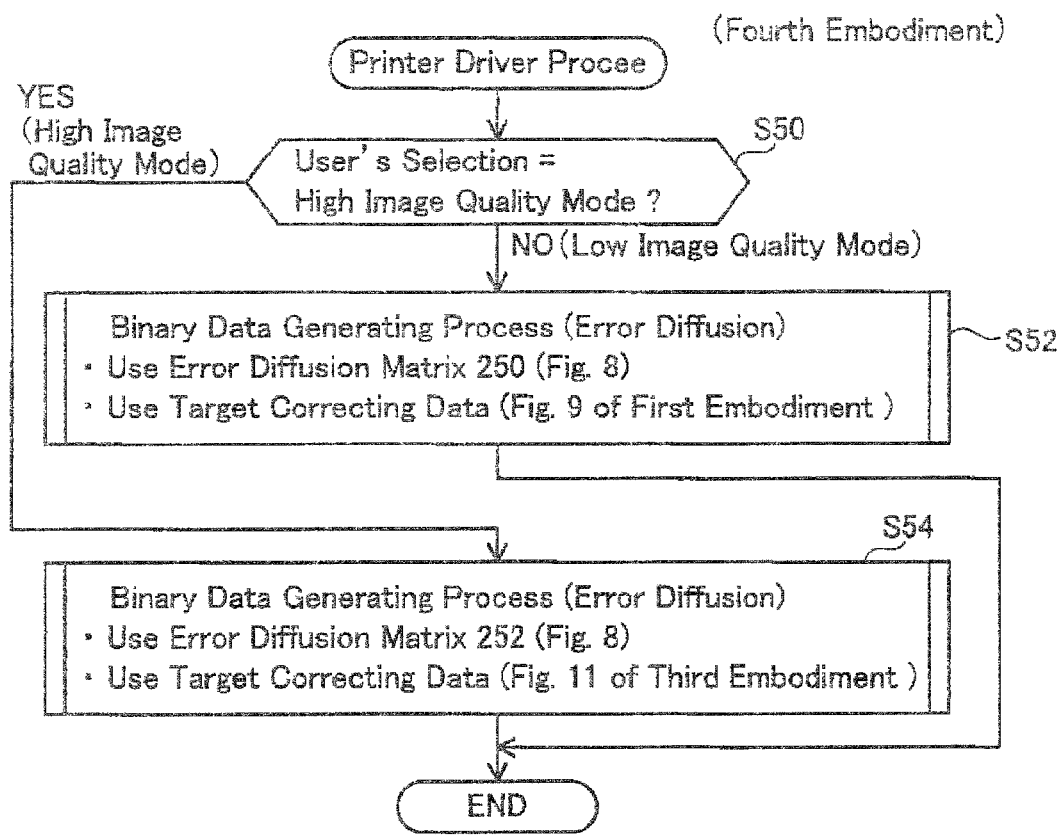
FIG. 13 shows a flowchart of a printer driver process of a fourth embodiment.

In the present embodiment, as shown in FIG. 13, when performing an operation on the operation unit 12 to print an image, the user can select one mode from among high image quality mode and low image quality mode. In a case where the low image quality mode is selected by the user (in case of NO in S50), the first generating unit 32 executes the binary data generating process of S52, and in a case where the high image quality mode is selected by the user (in case of YES in S50), the first generating unit 32 executes the binary data generating process of S54.

In the binary data generating process of S52 and the binary data generating process of S54, the flow of processes is the same as the flowchart of FIG. 5. However, in the binary data generating process of S52, the halftone process unit 34 executes the halftone process in accordance with the error diffusion method using the error diffusion matrix 250, as in the case of the first embodiment. In this case, in S32 of FIG. 5, the compensating unit 40 generates the target correcting data according to the formula shown in FIG. 9. On the other hand, in the binary data generating process of S54, the halftone process unit 34 executes the halftone process in accordance with the error diffusion method using the error diffusion matrix 252, as in the third embodiment. In this case, in S32 of FIG. 5, the compensating unit 40 generates the target correcting data according to the formula shown in FIG. 11.

In the present embodiment, the PC 10 can execute the halftone process in accordance with the error diffusion method using the error diffusion matrices 250, 252 appropriate for the high image quality mode or low image quality mode selected by the user. In particular, in case of using the comparatively complex error diffusion matrix 252 (in case of the high image quality mode), the PC 10 can more adequately disperse the error value among the peripheral pixels, and can consequently generate binary data in which the color of the RGB image data is adequately represented. Therefore, high quality printing results can be provided to the user. Further, in the present embodiment, since the coefficient x appropriate for the error diffusion matrices 250, 252 (x=1/2×r in S52, x=5/8×r in S54) is decided, the PC 10 can adequately compensate for the variability in ink discharging volume of the plurality of nozzles in accordance with the high image quality mode or low image quality mode selected by the user.

Further, in the present embodiment, the "low image quality mode" and the "high image quality mode" are respectively examples of the "first mode" and the "second mode". The error diffusion matrix 250 and the error diffusion matrix 252 are respectively examples of the "first error diffusion matrix" and the "second error diffusion matrix". Further, the six peripheral pixels shown in the error diffusion matrix 252 are an example of the "N1 pieces of peripheral pixels", and the four peripheral pixels, within the six peripheral pixels, that are included in a line other than the line including the target pixel, are an example of the "N2 pieces of peripheral pixels".

Fifth Embodiment

Figure 14:
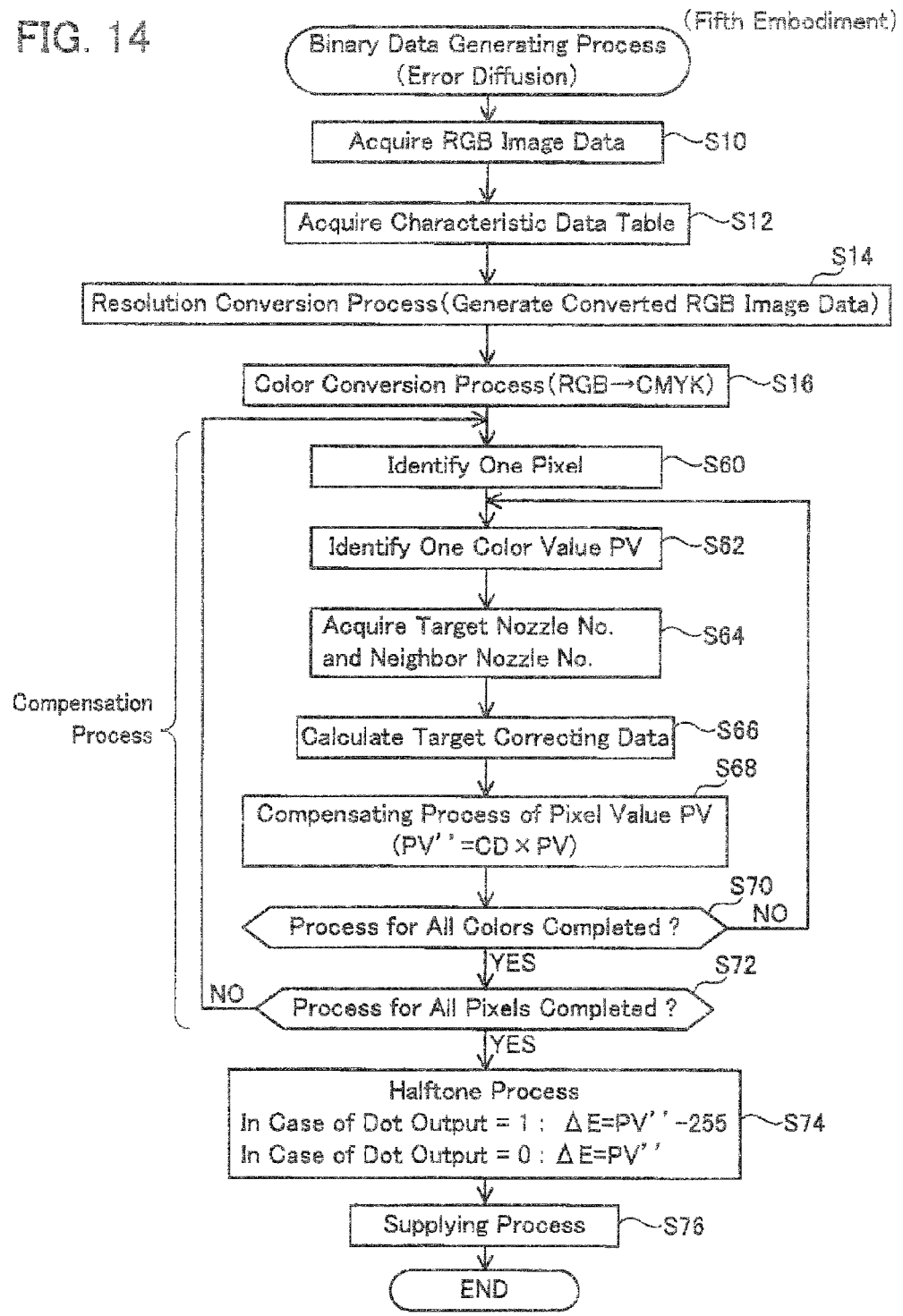
FIG. 14 shows a flowchart of a binary data generating process of a fifth embodiment.

In the present embodiment, the control unit 30 of the PC 10 executes the binary data generating process of FIG. 14 instead of the binary data generating process of FIG. 5. S10 to S16 are the same as the first embodiment (FIG. 5). Upon ending S16, the compensating unit 40 executes the compensation process (S60 to S72) for generating compensated image data 300 (see FIG. 15) from the CMYK image data 210 (see FIG. 7).

In S60, the compensating unit 40 identifies one pixel (called the "target pixel" below) from among the CMYK image data 210. Below, the description continues using the case of the pixel 217 being the target pixel as an example. Next, in S62, the compensating unit 40 identifies the one value PV(i, j) from among the four CMYK values that constitute the target pixel 217. Next, in S64, the compensating unit 40 identifies the target nozzle number and the first neighbor nozzle number using the same method as S30 of FIG. 5.

Next, in S66, the compensating unit 40 acquires the characteristic data corresponding to the target nozzle number and the characteristic data corresponding to the first neighbor nozzle number from the characteristic data table 60. In S66, further, the compensating unit 40 calculates the target correcting data using the same method as S32 of FIG. 5.

Next, in S68, the compensating unit 40 calculates a compensated value PV"(i, j) by multiplying CD(j) by the PV(i, j). As shown in FIG. 15, CD(j) is (255+minimum characteristic data)/target correcting data. Here, the "minimum characteristic data" is characteristic data showing the minimum discharging volume within the n pieces of characteristic data corresponding to the n nozzles of the color corresponding to the PV identified in S62. In the present embodiment, the "minimum characteristic data" is zero. S70 and S72 are the same as S38 and S40 of FIG. 5.

The compensating unit 40 calculates the compensated value PV"(i, j) for each of the four values CMYK that constitute the target pixel 217. Consequently, a compensated pixel having four compensated values corresponding to the four colors CMYK is generated based on the target pixel 217. Similarly, the compensating unit 40 generates compensated pixels for the pixels other than the pixel 217. Thereby, the compensated image data 300 shown in FIG. 15 is acquired. As described above, by executing the compensation process in the CMYK color space, the compensating unit 40 generates the compensated image data 300 from the CMYK image data 210.

In S74, the halftone process unit 34 executes the halftone process on the compensated image data 300. The halftone process of the present embodiment differs from the halftone process of FIG. 5 (S18 to S40) in the following points. In S18, the target pixel in the compensated image data 300 is identified, and in S20 the one value PV" (the compensated value acquired in S68) is identified from among the four values that constitute the target pixel. In S22, the PV' is calculated by adding the error value to the PV" identified in S20. The processes S30, S32 shown in FIG. 5 are not executed. Further, in S34, in case dot output=1, the error value ΔE is calculated by subtracting 255 from the PV'. The other processes are identical to those in the first embodiment.

Further, in the present embodiment, either the error diffusion matrix 250 or the error diffusion matrix 252 of FIG. 8 may be used. Further, as in the third embodiment, "255+Dtarget+x·(Dtarget−Dpre1)+y·(Dpre1−Dpre2)" may be used as the target correcting data.

In the present embodiment, as well, when executing the compensation process (S60 to S72 of FIG. 14) to compensate for the variability in ink discharging volume of the plurality of nozzles, the PC 10 uses the target correcting data acquired using the difference between Dtarget and Dpre1. Consequently, the PC 10 can adequately compensate for the variability in ink discharging volume of the plurality of nozzles. As a result, high quality printing results can be provided to the user. Moreover, in the present embodiment, the compensation process (S60 to S72) and the halftone process (S74) are an example of the "first type of image process".

Sixth Embodiment

In the present embodiment, in S30 of FIG. 5, in a case where the line number of the target pixel is "j", in addition to the target nozzle number corresponding to the line number "j", the first neighbor nozzle number corresponding to the line number "j−1", and the second neighbor nozzle number corresponding to the line number "j−2", the compensating unit 40 identifies a third neighbor nozzle number corresponding to line number "j+1". As in the first embodiment, the third neighbor nozzle number is identified based on the line number "j+1" and the first nozzle number table. For example, in case the target nozzle for K is the nozzle for K Nk4 of FIG. 4, the compensating unit 40 identifies the nozzle number for K "Nk5" of a nozzle Nk5 as the third neighbor nozzle number for K.

As is clear from FIG. 4, the third neighbor nozzle for K Nk5 is the nozzle that forms a third neighbor raster R5 adjacent to the target raster R4 formed by the target nozzle for K Nk4. In the sub scan direction, the third neighbor nozzle for K Nk5 is positioned at an upstream side from the target nozzle for K Nk4. Further, the third neighbor nozzle for K Nk5 is a nozzle that forms a dot on the print medium at a position corresponding to a pixel (not shown) whose error value is calculated after the target pixel 217 of FIG. 8.

In S32 of FIG. 5, the compensating unit 40 acquires the characteristic data corresponding to the target nozzle number, and three pieces of characteristic data corresponding to the first to third neighbor nozzle numbers from the characteristic data table 60 in the work area 22. In S32, further, the compensating unit 40 calculates the target correcting data according to a formula of FIG. 16C (target correcting data=255+AVEtarget+x·(AVEtarget−AVEpre1)). Here, "AVEtarget" is the average value of the characteristic data corresponding to the target nozzle, the characteristic data corresponding to the first neighbor nozzle and the characteristic data corresponding to the third nozzle for K. "AVEpre1" is the average value of the characteristic data corresponding to the first neighbor nozzle, the characteristic data corresponding to the second neighbor nozzle and the characteristic data corresponding to the target nozzle.

(Effects of Sixth Embodiment)

The effects of the present embodiment will be described with reference to FIGS. 16A and 16B. The graphs corresponding to the first comparison example of FIGS. 16A and 16B (the dotted line graphs) are the same as the graphs corresponding to the comparison example of FIGS. 12A and 12B. The graph corresponding to the second comparison example of FIG. 16B (the thin solid line graph) is a graph in which the characteristic data corresponding to the nozzles for K has been corrected by the AVEtarget (the average value of the characteristic data of three consecutive nozzles for K). Further, the graph corresponding to the second comparison example of FIG. 16A (the thin solid line graph) shows the output density of the rasters for the case of simulation being executed based on the binary data generated by employing "255+AVEtarget" as the target correcting data in the binary data generating process of FIG. 5. In the second comparison example, there is less difference in density between adjacent rasters than in the first comparison example, and these can be called high quality printing results.

Figure 16B:
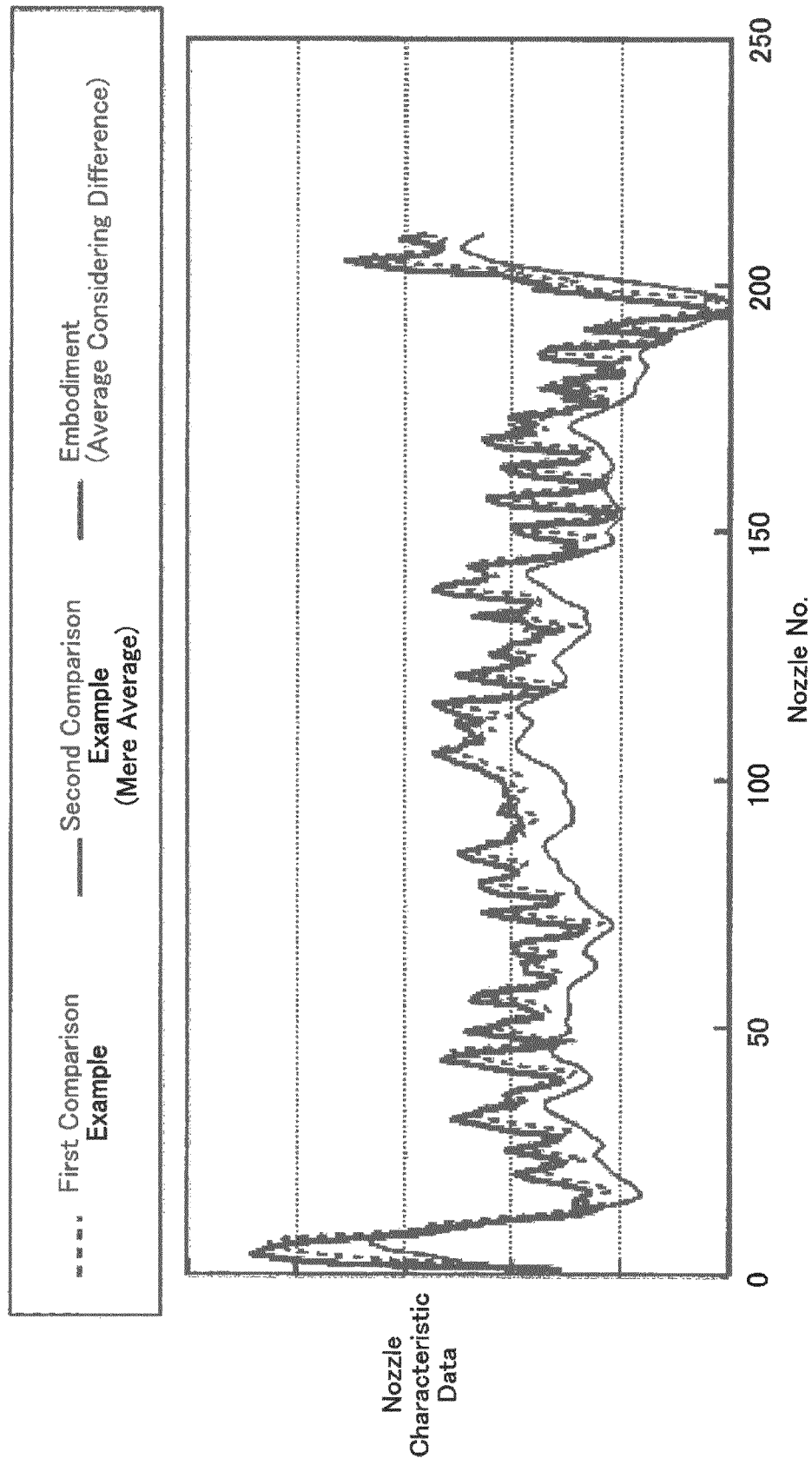
FIG. 16B shows graph for explaining the results of the sixth embodiment.

The graph corresponding to the embodiment of FIG. 16B (the thick solid line graph) is a graph in which the characteristic data corresponding to the nozzles for K has been corrected by "AVEtarget+x·(AVEtarget−AVEpre1)". Further, the graph corresponding to the embodiment of FIG. 16A (the thick solid line graph) shows the output density of the rasters for the case of simulation being executed based on the binary data generated by employing "255+AVEtarget+x·(AVEtarget−AVEpre1)" as the target correcting data in the binary data generating process of FIG. 5. As is clear from FIG. 16A, in the present embodiment there is less difference in density between adjacent rasters than in the second comparison example, and these can be called higher quality printing results.

In the present embodiment, the rasters R3 and R5 of FIG. 4 are an example of L (L=2) pieces of rasters in the position neighboring the target raster R4, and the rasters R2 and R4 of FIG. 4 are an example of L (L=2) pieces of rasters in the position neighboring the first neighbor raster R3. The average value AVEtarget of the three pieces of characteristic data corresponding to the three nozzles for K Nk3 to Nk5 that form the three rasters R3 to R5 is an example of the "target value", the average value AVEpre1 of the three pieces of characteristic data corresponding to the three nozzles for K Nk2 to Nk4 that form the three rasters R2 to R4 is an example of the "first value", and AVEtarget−AVEpre1 is an example of the "first difference".

Further, as described above, in the first embodiment, etc., for example, the characteristic data corresponding to the target nozzle for K Nk4 is itself an example of the "target value". By contrast, in the present embodiment, e.g., the AVEtarget calculated using the target nozzle for K Nk4 is an example of the "target value". That is, generally speaking, the "target value" may be a value acquired using the characteristic data corresponding to the target image forming element (may be the characteristic data itself, may be a value calculated using the characteristic data). Similarly, the "first value" may be a value acquired using the characteristic data corresponding to the first image forming element.

Further, in a variant, only the one raster R3 may be adopted as the L pieces of rasters at a position neighboring the target raster R4, and only the one raster R2 may be adopted as the L pieces of rasters at a position neighboring the first neighbor raster R3. Further, in another variant, the four rasters R2, R3, R5, R6 may be adopted as the L pieces of rasters at a position neighboring the target raster R4, and the four rasters R1, R2, R4, R5 may be adopted as the L pieces of rasters at a position neighboring the first neighbor raster R3. Generally speaking, "L" may be equal to or more than 1.

Seventh Embodiment

In the present embodiment, in a case where binary data is supplied from the PC 10, the print performing unit 70 of the printer 50 operates in a second print mode instead of the first print mode (see FIG. 4). The second print mode will be described using the case of monochrome printing as an example. Moreover, printing corresponding to the second print mode may be called "interlaced printing".

Figure 17:
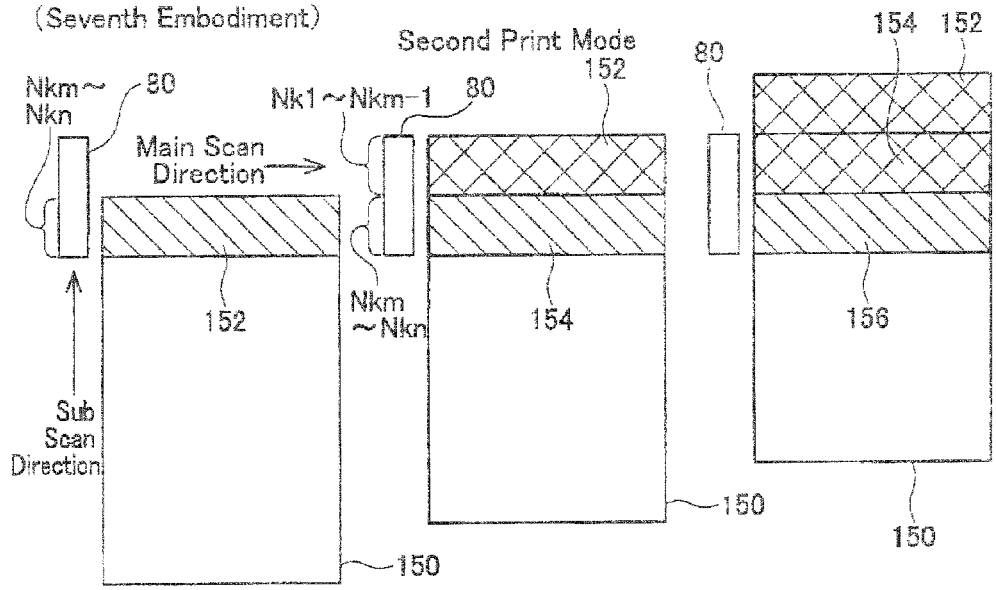
FIG. 17 shows how a print medium is transported in a second print mode of a seventh embodiment.
Figure 18:
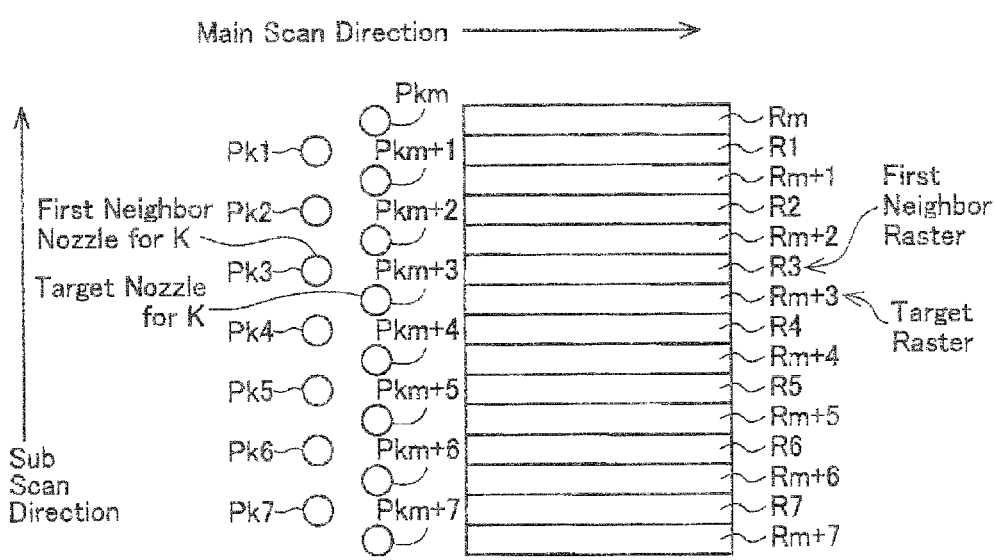
FIG. 18 shows a raster group formed in the second print mode.

As shown in FIG. 17, in the second print mode, the print performing unit 70 first executes a first main scan of the print head 80 such that printing is executed on a portion 152 of print medium 150. The portion 152 is a portion, in the print medium 150, positioned furthest downstream in the sub scan direction. For example, in a case where n is an odd number, in the first main scan, the (n+1)/two nozzles for K Nkm to Nkn which, from among the n nozzles for K Nk1, etc., are present at the upstream side in the sub scan direction (the lower side in FIG. 17), form (n+1)/two rasters on the portion 152. Moreover, "m" above is (n+1)/2. FIG. 18 shows how eight nozzles for K Nkm to Nkm+7 (projected points Pkm to Pkm+7 are shown in FIG. 18), from among the (n+1)/two nozzles for K Nkm to Nkn, form eight rasters Rm to Rm+7 in the first main scan.

Next, the print performing unit 70 transports the print medium 150. In the second print mode, a second distance is adopted as the transporting distance here. For example, in case n is an odd number, the second distance is the distance of n/2 nozzle pitches. When this transporting is performed, as shown in FIG. 17, the (n−1)/two nozzles for K Nk1 to Nkm−1 present at the lower side in the sub scan direction (the upper side in FIG. 17) are each positioned between two adjacent rasters (e.g., Rkm and Rkm+1) formed by the first main scan. In this state, the print performing unit 70 executes a second main scan of the print head 80. Thereby, each of the (n−1)/two nozzles for K Nk1 to Nkm−1 forms one raster between the two adjacent rasters formed on the portion 152 of the print medium 150 by the first main scan. FIG. 18 shows how seven nozzles for K Nk1 to Nk7 (projected points Pk1 to Pk7 are shown in FIG. 6), from among the (n−1)/two nozzles for K Nk1 to Nkm−1, form seven rasters R1 to R7 in the second main scan. In the second main scan, further, the (n+1)/two nozzles for K Nkm to Nkn, which are present at the upstream side in the sub scan direction (the lower side in FIG. 17), form (n+1)/two rasters on a portion 154 of the print medium 150 (see the central figure in FIG. 17). The portion 154 is a portion adjacent to the portion 152, and is a portion positioned at the upstream side from the portion 152 in the sub scan direction.

The print performing unit 70 repeatedly executes the combination of transporting the print medium 150 by the second distance and executing the main scan of the print head 80. Thereby, in e.g., a third main scan, each of (n−1)/two nozzles for K Nk1 to Nkm−1 forms one raster between the two adjacent rasters formed on the portion 154 of the print medium 150 by the second main scan. In the third main scan, further, (n+1)/two nozzles for K Nkm to Nkn form (n+1)/two rasters on a portion 156 of the print medium 150 (see the rightmost figure in FIG. 17). The portion 156 is a portion adjacent to the portion 154, and is a portion positioned at the upstream side from the portion 154 in the sub scan direction. The print performing unit 70 repeatedly executes the combination of transporting the print medium by the second distance and executing the main scan of the print head 80. Thereby, the image represented by the binary data is printed on the print medium. Moreover, the second print mode in the case of color printing is the same as in the case of monochrome printing, excepting for the point that the other color nozzle groups 84c, etc. are used.

In the present embodiment, the contents of the processes S30 of FIG. 5 and S32 differ from the first embodiment. As described above, the second print mode is executed as shown in FIG. 17 and FIG. 18. That is, e.g., in case n is an odd number, in the first main scan, the nozzles for K Nkm to Nkn form rasters corresponding to the odd number lines. The odd number lines are within the 1 to n lines of the CMYK image data 210. Further, the transporting distance of the second print mode (the second distance) in a case where n is an odd number, for example, is the distance of n/2 nozzle pitches. Based on this content, the target nozzle for K that forms the raster corresponding to the j line of the CMYK image data 210 can be identified. In the present embodiment, instead of the first nozzle number for K table, a second nozzle number for K table for identifying the target nozzle numbers for K from the line numbers of the CMYK image data 210 is registered in advance in the printer driver 24 (see FIG. 1).

In S30 of FIG. 5, the compensating unit 40 identifies the target nozzle number for K based on the line number "j" of the target pixel and the second nozzle number for K table, and identifies the first neighbor nozzle number for K based on the line number "j−1" and the second nozzle number for K table. For example, in a case where the target nozzle for K is nozzle for K Nkm+3 of FIG. 18 (a projected point Pkm+3 is shown in FIG. 18), the compensating unit 40 identifies, as the first neighbor nozzle number for K, nozzle number for K "Nk3 (a projected point Pk3 is shown in FIG. 18)", which corresponds to the first neighbor nozzle for K Pk3 that forms the raster R3 adjacent to a target raster Rm+3.

Further, the processes for CMY, which are the colors other than K, are executed in the same manner as for K. The other processes are the same as in the first embodiment, etc. In the present embodiment, in case the printer 50 executes interlaced printing, the PC 10 can adequately identify the target nozzle and the first neighbor nozzle, and consequently can execute the compensation process using the appropriate target correcting data.

Eighth Embodiment

In the present embodiment, in a case where the binary data is supplied from the PC 10, the print performing unit 70 of the printer 50 operates in a third print mode instead of the first print mode (see FIG. 4). Moreover, printing corresponding to the third print mode may be called "singling". Moreover, singling can also be called the "overlap method".

Figure 19:
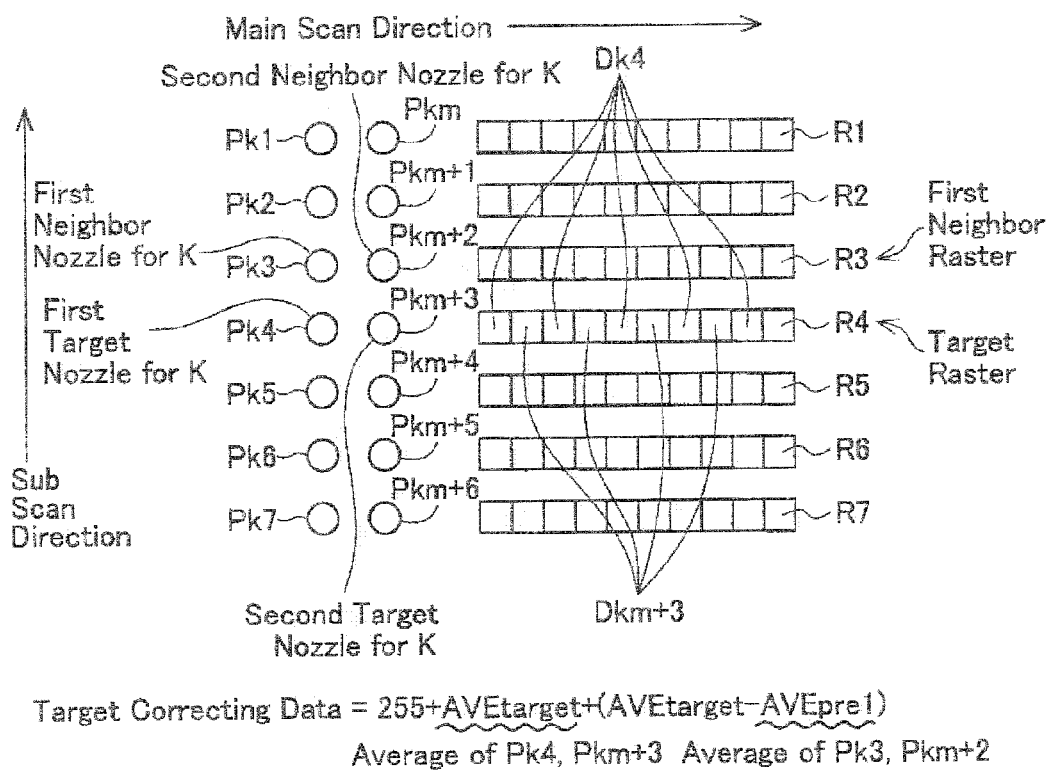
FIG. 19 shows a raster group formed in a third print mode of an eighth embodiment.

The third print mode will be described using the case of monochrome printing as an example. In either the first print mode of the first embodiment or the second print mode of the seventh embodiment, one nozzle for K forms one raster using one main scan of the print head 80. By contrast, in singling, two nozzles for K form one raster using two main scans of the print head 80. For example, as shown in FIG. 19, in the first main scan of the print head 80, the nozzle for K Nkm+3 (the projected point Pkm+3 is shown in FIG. 19) forms a dot group Dkm+3. Next, in the second main scan of the print head 80, the nozzle for K Nk4 (a projected point Pk4 is shown in FIG. 19) forms a dot group Dk4. The one raster R4 is constituted by the dot group Dkm+3 and the dot group Dk4.

As is clear from the above description, in the first main scan, the dot group Dkm+3 is formed in accordance with a first pixel group that is equivalent to half of the plurality of pixels constituting a specific line of the binary data. Then, in the second main scan, the dot group Dk4 is formed in accordance with a remaining second pixel group which constitutes the specific line. The first pixel group and the second pixel group are positioned alternately in the specific line of the binary data. That is, each of the first pixel group is a pixel belonging to, e.g., an even number column, and each of the second pixel group is a pixel belonging to, e.g., an odd number column.

For example, in a case where n is an even number, in the first main scan, each of the n/2 nozzles for K Nkm to Nkn which are positioned at the upstream side form the first dot group (e.g., the dot group Dkm+3 of FIG. 19). Next, the print performing unit 70 transports the print medium 150. In singling, a third distance is adopted as the transporting distance here. The third distance is the distance of n/2 nozzle pitches. When this transporting is performed, as shown in FIG. 19, the n/2 nozzles for K Nk1 to Nkm positioned at the downstream side are each located, in the sub scan direction, in the same position as the first dot group. For example, the nozzle for K Nk4 is located in the same position as the dot Dkm+3. In this state, the print performing unit 70 executes the second main scan of the print head 80. Thereby, the n/2 nozzles for K Nk1 to Nkm positioned at the downstream side each form the second dot group (e.g., the dot group Dk4 of FIG. 19). The n/2 rasters R1, etc. are constituted by the first dot group and the second dot group. Moreover, in the second main scan, the n/2 nozzles for K Nkm to Nkn, which are positioned at the upstream side, also form a dot group. The print performing unit 70 repeatedly executes the combination of transporting the print medium 150 by the third distance and executing the main scan of the print head 80. Thereby, an image represented by the binary data is printed on the print medium.

In the present embodiment, the contents of the processes S30 and S32 of FIG. 5 differ from the first embodiment. In the present embodiment, a third nozzle number for K table instead of the first nozzle number for K table is registered in the printer driver 24 (see FIG. 1). The third nozzle number for K table is a table for identifying the first target nozzle number for K, the second target nozzle number for K, the first neighbor nozzle number for K, and the second neighbor nozzle number for K from the column number and line number (i, j) of the target pixel. Here, in a case where the column number and line number of the target pixel is (i, j), the "first target nozzle number for K" is a nozzle for K that forms a dot on the print medium at a position corresponding to the target pixel (i, j), and the "second target nozzle number for K" is a nozzle for K that forms a dot on the print medium at a position corresponding to pixel (i−1, j). Further, the "first neighbor nozzle number for K" is a nozzle for K that forms a dot on the print medium at a position corresponding to pixel (i, j−1), and the "second neighbor nozzle number for K" is a nozzle for K that forms a dot on the print medium at a position corresponding to pixel (i−1, j−1).

In S30 of FIG. 5, the compensating unit 40 identifies the first and the second target nozzle numbers for K and the first and the second neighbor nozzle numbers for K using the third nozzle number for K table. For example, in a case where the first target nozzle for K is the nozzle for K Nk4, the compensating unit 40 identifies the first target nozzle number for K "Nk4", the second target nozzle number for K "Nkm+3", the first neighbor nozzle number for K "Nk3", and the second neighbor nozzle number for K "Nkm+2".

In S32 of FIG. 5, the compensating unit 40 acquires four pieces of characteristic data corresponding to the four nozzle numbers for K identified in S30. In S32, further, the compensating unit 40 calculates the target correcting data in accordance with a formula of FIG. 19 (255+AVEtarget+x·(AVEtarget−AVEpre1)). Here, "AVEtarget" is the average value of two pieces of characteristic data corresponding to the first and second target nozzles for K (e.g., the nozzles for K Nk4, Nkm+3), and "AVEpre1" is the average value of two pieces of characteristic data corresponding to the first and second neighbor nozzles for K (e.g., the nozzles for K Nk3, Nkm+2).

Further, the processes for CMY, which are the colors other than K, are executed in the same manner as for K. The other processes are the same as in the first embodiment, etc. In the present embodiment, in a case where the printer 50 executes singling, the PC 10 can adequately identify the target nozzle, the first neighbor nozzle, etc. and consequently can execute the compensation process using the appropriate target correcting data. Moreover, in the present embodiment, AVEtarget, AVEpre1, and AVEtarget−AVEpre1 are respectively examples of the "target value", the "first value" and the "first difference".

Ninth Embodiment

Figure 20:
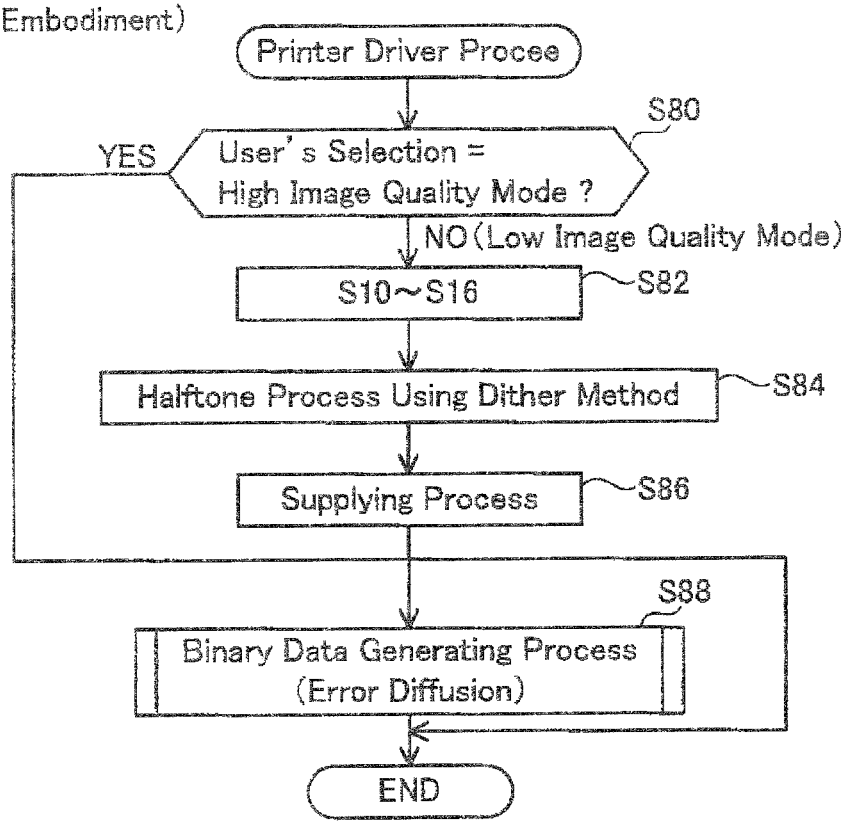
FIG. 20 shows a flowchart of a printer driver process of a ninth embodiment.

In the present embodiment, as shown in FIG. 20, when performing an operation on the operation unit 12 to print an image, the user can select one mode from among high image quality mode and low image quality mode. In a case where the low image quality mode is selected by the user (in case of NO in S80), in S82 the second generating unit 42 (see FIG. 1) executes processes identical to S10 to S16 of FIG. 5, and then, in S84, executes the binary data generating process in accordance with the dither method. On the other hand, in a case where the high image quality mode is selected by the user (in case of YES in S80), in S88 the first generating unit 32 executes the binary data generating process in accordance with the error diffusion method.

In the binary data generating process in accordance with the dither method of S84, the second generating unit 42 executes the halftone process on the CMYK image data 210 using a predetermined dither matrix, thus generating the binary data. Moreover, the second generating unit 42 does not execute a process for compensating for the variability in ink discharging volume of the plurality of nozzles (the process SS30 to S34 of FIG. 5, the process S60 to S72 of FIG. 14, etc.). In S86, the supplying unit 44 supplies the binary data generated in S84 to the printer 50.

Further, the binary data generating process in accordance with the error diffusion method of S88 is the same as the binary data generating process of FIG. 5 or FIG. 14. Consequently, in the binary data generating process in accordance with the error diffusion method of S88, a compensation process using difference is executed. By contrast, as described above, in the binary data generating process in accordance with the dither method of S84, a compensation process using difference is not executed. Unlike the error diffusion method, the dither method is a process that does not perform error value feedback, and consequently the problem of delay in the compensation process does not occur. However, due to being a process that does not perform error value feedback, the dither method has a lower image quality than the error diffusion method. Consequently, in a case where the binary data generating process in accordance with the error diffusion method of S88 is executed, higher image quality printing results can be provided to the user than in the case where the binary data generating process in accordance with the dither method of S84 is executed.

In the present embodiment, the PC 10 can execute an appropriate image process in accordance with the mode selected by the user (the binary data generating process in accordance with the error diffusion method (S88) or the binary data generating process in accordance with the dither method (S84)). Moreover, in the present embodiment, the "high image quality mode" and the "low image quality mode" are respectively examples of the "third mode" and the "fourth mode". Further, the process S84 and the binary data generated in S84 are respectively examples of the "second type of image process" and the "second type of processed image data".

Tenth Embodiment

In the above embodiments, the characteristic data table 60 of FIG. 3 is stored in the storing unit 56 of the printer 50. In the present embodiment, the storing unit 56 of the printer 50 stores a correcting data table 400 of FIG. 21 instead of the characteristic data table 60. For each of 4n nozzles, target correcting data to be used in a case where the nozzle is the target nozzle is registered in the correcting data table 400. That is, for each of the 4n nozzles, the manufacturer of the printer 50 calculates the target correcting data for the nozzle (e.g., 255+Dtarget+x·(Dtarget−Dpre1)) in the case where the nozzle is the target nozzle by, e.g., executing the calculation executed in S30 and S32 of FIG. 5. Thereby, the correcting data table 400 is acquired. The manufacturer stores the correcting data table 400 in the storing unit 56 of the printer 50.

In the present embodiment, in S12 of FIG. 5 the first generating unit 32 of the PC 10 acquires the correcting data table 400 from the printer 50. In S30 of FIG. 5 the compensating unit 40 identifies only the target nozzle number, and does not identify the first neighbor nozzle number. The compensating unit 40 does not execute the process S32 of FIG. 5. In S34 of FIG. 5 the compensating unit 40 acquires the target correcting data corresponding to the target nozzle number from the correcting data table 400. The other processes are identical to those in the first embodiment. In the present embodiment, the first generating unit 32 of the PC 10 need not calculate the target correcting data.

(Variant 1) In the above embodiments, the PC 10 comprises the control unit 30 which includes the first generating unit 32 and the supplying unit 44. However, instead, the printer 50 may comprise the control unit 30 which includes the first generating unit 32 and the supplying unit 44. In this case, the control unit 30 of the printer 50 is an example of the "control device".

(Variant 2) In the first embodiment, etc., in S30 of FIG. 5 the compensating unit 40 identifies the nozzle for K Nk3 that forms the raster R3 adjacent to the target raster for K R4 as the first neighbor nozzle for K (see FIG. 4). Instead, the compensating unit 40 may identify, as the first neighbor nozzle for K, e.g., the nozzle for K Nk2 that forms a raster (e.g., the raster R2) which is in a neighboring position to the target raster R4 but is not adjacent to the target raster R4. Generally speaking, the "first image forming element" may form the first neighbor raster that is in a neighboring position to the target raster and may form an image at a position on the print medium corresponding to a first pixel for which the error value is calculated before the target pixel.

(Variant 3) In the third embodiment, in S30 of FIG. 5 the compensating unit 40 identifies the nozzle for K Nk2 that forms the raster R2 adjacent to the first neighbor raster R3 as the second neighbor nozzle for K. Instead, the compensating unit 40 may identify, as the second neighbor nozzle for K, e.g., the nozzle for K Nk1 that forms a raster (e.g., the raster R1) which is in a neighboring position to the target raster R3 but is not adjacent to the target raster R3. Generally speaking, the "second image forming element" may form the second neighbor raster that is in a neighboring position to the first neighbor raster, and may form an image at a position on the print medium corresponding to a second pixel for which the error value is calculated before the first pixel.

(Variant 4) In the above embodiments, the halftone process unit 34 generates the binary data indicating dot output=1 and dot output=0. However, the halftone process unit 34 may generate data having three or more values. For example, the halftone process unit 34 may generate four-value data indicating a value "3" corresponding to large dot, a value "2" corresponding to medium dot, a value "1" corresponding to small dot, and "0" corresponding to no dot. In this case, the halftone process unit 34 may use, as the thresholds used in S24 of FIG. 5, a threshold Th1 (e.g., 191) to distinguish between the large dot and medium dot, a threshold Th2 (e.g., 127) to distinguish between the medium dot and small dot, and a threshold Th3 (e.g., 63) to distinguish between the small dot and no dot. In this case, the compensating unit 40 may change the target correcting data calculated in S32 of FIG. 5 in accordance with the dot size to be formed. For example, in case of forming a medium dot, the halftone process unit 34 identifies (255+Dtarget+x·(Dtarget−Dpre1))×(density to be represented by the medium dot)/(density to be represented by the large dot (e.g., 255)) as the target correcting data and, in case of forming a small dot, the halftone process unit 34 may identify (255+Dtarget+x·(Dtarget−Dpre1))×(density to be represented by the small dot)/(density to be represented by the large dot (e.g., 255)) as the target correcting data.

(Variant 5) In the above embodiments, the error value calculated in S34 is stored, in S36 of FIG. 5, in the work area 22 as the error value corresponding to the target pixel. In S22 of FIG. 5, the correcting unit 36 calculates the PV' by collecting the error values stored in S36 (the error values corresponding to the peripheral pixels positioned at a periphery of the target pixel). Instead, in S36, the correcting unit 36 may allocate the error value calculated in S34 to the unprocessed pixels positioned at the periphery of the target pixel. For example, in a case where the error value ΔEk(i, j) corresponding to K of the pixel 217 of FIG. 8 has been calculated, in S36 the correcting unit 36 may calculate a new value K of the pixel 218 by calculating the summation of K(i+1, j) which is the K value of the unprocessed pixel 218 and a value in which the error value ΔEk and the coefficient "½" have been multiplied. In a case where this configuration is adopted, the PV identified in S20 of FIG. 5 is identical to the PV', and the process S22 of FIG. 5 need not be executed.

(Variant 6) In the characteristic data table 60 of FIG. 3, the characteristic data corresponding to the nozzle having the minimum discharging volume has been set at zero for all the colors CMYK. However, e.g., the characteristic data corresponding to a nozzle having a predetermined standard discharging volume may be set at zero. In this case, minus value characteristic data may be present in the characteristic data table 60 of FIG. 3.

(Variant 7) In the above embodiments, the numerical value "255" has been adopted for calculating the target correcting data (255+Dtarget+x·(Dtarget−Dpre1)) in S32 of FIG. 5. This means that "255 (the maximum value a pixel can have within the CMYK image data 210)" has been adopted as the density value of a dot formed by the nozzle having the minimum discharging volume. Instead of this configuration, a numerical value other than "255" may be used as the numerical value for calculating the target correcting data.

(Variant 8) In the characteristic data table 60 of FIG. 3, the characteristic data corresponding to the nozzle having the minimum discharging volume may be set at "255". That is, the characteristic data may be a value acquired by adding "255" to the value shown in FIG. 3. In this case, in S32 of FIG. 5, the compensating unit 40 may calculate the target correcting data in accordance with the formula "Dtarget+x·(Dtarget−Dpre1)" (i.e., adding "255" is not necessary). As described above in (variant 6) to (variant 8), generally speaking, the "characteristic data" may be any data related to the output of the corresponding image forming element.

(Variant 9) In the above embodiments, the ink jet printer 50 is used. That is, the nozzles Nk1, etc. of the ink jet printer 50 are an example of the "image forming element". Instead, e.g., a LED printer comprising a plurality of LED elements may be used, a thermal printer comprising a plurality of heat generating elements may be used, or a multi-beam laser printer comprising a plurality of laser beam generating elements may be used. In these examples, the LED elements, the heat generating elements, or the laser beam generating elements are an example of the "image forming element". Generally speaking, the "compensation process" may be any process which compensates for the variability of outputs of the plurality of image forming elements.

(Variant 10) In the above embodiments, the control unit 30 of the PC 10 realizes the units 30 to 44 by executing processes in accordance with software (the printer driver 24). Instead, at least one unit of the units 30 to 44 may be realized by hardware such as a logic circuit, etc.

The invention claimed is:

1. A control device for causing a print performing unit to perform a print, the print performing unit including a print head on which a plurality of image forming elements is formed, the control device comprising:
   one or more processors; and
   a memory that stores a computer program including instructions executed by the one or more processors,
   wherein the instructions cause the one or more processors, when executed by the one or more processors, to function as:
   a first generating unit configured to generate a first type of processed image data by executing a first type of image process on target image data of a process target in accordance with an error diffusion method using a first error diffusion matrix; and
   a supplying unit configured to supply the first type of processed image data to the print performing unit in a case where the first type of processed image data is generated, wherein
   the first generating unit includes a compensating unit configured to execute a compensation process on a target pixel within the target image data for compensating variability of outputs of the plurality of the image forming elements, by using correcting data for a target image forming element which is to form an image at a position corresponding to the target pixel on the print medium,
   the correcting data is data acquired by using a value equivalent to a value calculated by multiplying a first coefficient by a first difference which is a difference between a target value and a first value,
   the target value is acquired by using characteristic data corresponding to the target image forming element,
   the first value is acquired by using characteristic data corresponding to a first image forming element within the plurality of image forming elements,
   the first image forming element is an image forming element which is to form a first neighbor raster neighboring a target raster formed on the print medium by the target image forming element,
   the first image forming element is an image forming element which is to form an image at a position corresponding to a first pixel on print medium, the first pixel being a pixel for which an error value is calculated before the target pixel,
   the characteristic data is data related to an output of an image forming element corresponding to the characteristic data,
   the first error diffusion matrix indicates M1 (M1 equal to or more than 2) pieces of error diffusion coefficients corresponding to M1 pieces of peripheral pixels positioned at the periphery of the target pixel,
   the first coefficient is decided based on a ratio between a summation of the M1 pieces of error diffusion coefficients and a summation of M2 (M2 less than M1) pieces of error diffusion coefficients corresponding to M2 pieces of peripheral pixels within the M1 pieces of peripheral pixels, and
   the M2 pieces of peripheral pixels are included in one or more rows other than a row including the target pixel.

2. The control device as in claim 1, wherein
   the first neighbor raster is a raster adjacent to the target raster.

3. The control device as in claim 1, wherein
   in a case where a first mode is selected by a user, the first generating unit is configured to generate the first type of processed image data in accordance with the error diffusion method using the first error diffusion matrix,
   in a case where a second mode is selected by the user, the first generating unit is configured to generate the first type of processed image data in accordance with the error diffusion method using a second error diffusion matrix,
   the second error diffusion matrix indicates N1 (N1 more than M1) pieces of error diffusion coefficients corresponding to N1 pieces of peripheral pixels positioned at the periphery of the target pixel,
   in the first mode, the first coefficient is decided based on the ratio between the summation of the M1 pieces of error diffusion coefficients and the summation of the M2 pieces of error diffusion coefficients corresponding to the M2 pieces of peripheral pixels within the M1 pieces of peripheral pixels,
   in the second mode, the first coefficient is decided based on a ratio between a summation of the N1 pieces of error diffusion coefficients and a summation of N2 (N2 less than N1) pieces of error diffusion coefficients corresponding to N2 pieces of peripheral pixels within the N1 pieces of peripheral pixels, and
   the N2 pieces of peripheral pixels are included in one or more lines other than a line including the target pixel.

4. The control device as in claim 1, wherein
the target value is an average value of L+1 (L equal to or more than 1) pieces of characteristic data including one piece of characteristic data corresponding to the target image forming element and L pieces of characteristic data corresponding to L pieces of image forming elements which are to form L pieces of rasters neighboring the target raster within the plurality of image forming elements, and
the first value is an average value of L+1 pieces of characteristic data including one piece of characteristic data corresponding to the first image forming element and L pieces of characteristic data corresponding to L pieces of image forming elements which are to form L pieces of rasters neighboring the first neighbor raster within the plurality of image forming elements.

5. The control device as in claim 1, wherein
in a case where a third mode is selected by a user, the first generating unit is configured to generate the first type of processed image data by executing the first image process on the target image data in accordance with the error diffusion method, and
the instructions cause the one or more processors, when executed by the one or more processors, to further function as: a second generating unit configured to generate a second type of processed image data by executing a second image process in accordance with a dither method on the target image data in a case where a fourth mode is selected by the user,
the supplying unit is further configured to supply the second type of processed image data to the print performing unit in a case where the second type of processed image data is generated, and
the second generating unit is configured to generate the second type of processed image data by executing the second type of image process without executing the compensation process.

6. The control device as in claim 1, wherein
the first generating unit includes:
a halftone process unit configured to generate the first type of processed image data by executing a halftone process on the target image data in accordance with the error diffusion method, and
the halftone process unit comprises:
a correcting unit configured to generate a corrected value by correcting a value of the target pixel within the target image data by using a plurality of error values corresponding to a plurality of peripheral pixels positioned at a periphery of the target pixel;
a deciding unit configured to decide, by comparing the corrected value and a threshold, whether or not an image is to be formed at the position corresponding to the target pixel on the print medium; and
a compensating unit configured to execute the compensation process for calculating an error value corresponding to the target pixel by using the corrected value and the correcting data in a case where it is decided that the image with respect to the target pixel is to be formed.

7. The control device as in claim 1, wherein
the compensating unit is configured to execute the compensation process for generating compensated image data by generating a compensated pixel from the target pixel within the target image data, and
the first generating unit further includes a halftone process unit configured to generate the first type of processed image data by executing a halftone process on the compensated image data in accordance with the error diffusion method.

8. The control device as in claim 1, wherein
the image forming element is a nozzle for discharging ink,
the compensation process is a process for compensating variability of ink discharging volumes of the plurality of image forming elements, and
the characteristic data is data related to the ink discharging volume of a corresponding image forming element.

9. A non-transitory computer-readable storage medium storing a computer program for a control device,
the computer program including instructions for ordering one or more processes of the control device to execute:
generating a first type of processed image data by executing a first type of image process on target image data of a process target in accordance with an error diffusion method using a first error diffusion matrix; and
supplying the first type of processed image data to the print performing unit in a case where the first type of processed image data is generated, wherein
the generating the first type of processed image data includes executing a compensation process on a target pixel within the target image data for compensating variability of outputs of the plurality of the image forming elements using correcting data for a target image forming element forming an image at a position corresponding to the target pixel on the print medium,
the correcting data is data acquired by using a value equivalent to a value calculated by multiplying a first coefficient by a first difference which is a difference between a target value acquired by using characteristic data corresponding to the target image forming element and a first value acquired by using characteristic data corresponding to a first image forming element within the plurality of image forming elements,
the first image forming element is an image forming element forming a first neighbor raster neighboring a target raster formed on the print medium by the target image forming element,
the first image forming element is an image forming element forming an image at a position corresponding to a first pixel on print medium, the first pixel being a pixel for which an error value is calculated before the target pixel,
the characteristic data is data related to an output of an image forming element corresponding to the characteristic data,
the first error diffusion matrix indicates M1 (M1 equal to or more than 2) pieces of error diffusion coefficients corresponding to M1 pieces of peripheral pixels positioned at the periphery of the target pixel,
the first coefficient is decided based on a ratio between a summation of the M1 pieces of error diffusion coefficients and a summation of M2 (M2 less than M1) pieces of error diffusion coefficients corresponding to M2 pieces of peripheral pixels within the M1 pieces of peripheral pixels, and
the M2 pieces of peripheral pixels are included in one or more rows other than a row including the target pixel.

10. A control device for causing a print performing unit to perform a print, the print performing unit including a print head on which a plurality of image forming elements is formed, the control device comprising:
one or more processors; and
a memory that stores a computer program including instructions executed by the one or more processors, wherein the instructions cause the one or more processors, when executed by the one or more processors, to function as:

a first generating unit configured to generate a first type of processed image data by executing a first type of image process on target image data of a process target in accordance with an error diffusion method; and a supplying unit configured to supply the first type of processed image data to the print performing unit in a case where the first type of processed image data is generated, wherein the first generating unit includes a compensating unit configured to execute a compensation process on a target pixel within the target image data for compensating variability of outputs of the plurality of the image forming elements, by using correcting data for a target image forming element which is to form an image at a position corresponding to the target pixel on the print medium, the correcting data is data acquired by using a first difference which is a difference between a target value and a first value, and a second difference which is a difference between the first value and a second value, the target value is acquired by using characteristic data corresponding to the target image forming element, the first value is acquired by using characteristic data corresponding to a first image forming element within the plurality of image forming elements, the first image forming element is an image forming element which is to form a first neighbor raster neighboring a target raster formed on the print medium by the target image forming element, the first image forming element is an image forming element which is to form an image at a position corresponding to a first pixel on print medium, the first pixel being a pixel for which an error value is calculated before the target pixel, the characteristic data is data related to an output of an image forming element corresponding to the characteristic data, the second value is acquired by using characteristic data corresponding to a second image forming element within the plurality of image forming elements, the second image forming element is an image forming element which is to form a second neighbor raster neighboring the first neighbor raster, and the second image forming element is an image forming element which is to form an image at a position corresponding to a second pixel on print medium, the second pixel being a pixel for which an error value is calculated before the first pixel.

11. The control device as in claim 10, wherein the second neighbor raster is a raster adjacent to the first neighbor raster.

12. The control device as in claim 10, wherein the correcting data is data acquired by using a value equivalent to a value calculated by multiplying a first coefficient by the first difference, and a value equivalent to a value calculated by multiplying a second coefficient by the second difference, and the first coefficient is greater than the second coefficient.

13. The control device as in claim 12, wherein the first generating unit is configured to generate the first type of processed image data in accordance with the error diffusion method using a first error diffusion matrix, the first error diffusion matrix indicates M1 (M1 equal to or more than 2) pieces of error diffusion coefficients corresponding to M1 pieces of peripheral pixels positioned at a periphery of the target pixel, the first coefficient is decided based on a ratio between a summation of the M1 pieces of error diffusion coefficients and a summation of M2 (M2 less than M1) pieces of error diffusion coefficients corresponding to M2 pieces of peripheral pixels within the M1 pieces of peripheral pixels, the M2 pieces of peripheral pixels is included in one or more lines other than a line including the target pixel, the second coefficient is decided based on a ratio between a summation of the M2 pieces of error diffusion coefficients and a summation of M3 (M3 less than M2) pieces of error diffusion coefficients corresponding to M3 pieces of peripheral pixels within the M2 pieces of peripheral pixels, and the M3 pieces of peripheral pixels are included in one or more rows other than a row including the first pixel.

* * * * *